United States Patent
Song et al.

(10) Patent No.: US 8,731,560 B2
(45) Date of Patent: May 20, 2014

(54) ACCESS POINT SYNCHRONIZATION WITH COOPERATIVE MOBILE DEVICES

(75) Inventors: Bongyong Song, San Diego, CA (US); Kaushik Chakraborty, San Diego, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/423,090

(22) Filed: Mar. 16, 2012

(65) Prior Publication Data

US 2013/0244653 A1   Sep. 19, 2013

(51) Int. Cl.
*H04W 36/00* (2009.01)

(52) U.S. Cl.
USPC ......... 455/436; 455/439; 455/550.1; 370/350

(58) Field of Classification Search
USPC ................... 455/436, 439, 550.1, 350
See application file for complete search history.

(56) References Cited

U.S. PATENT DOCUMENTS

| | | | |
|---|---|---|---|
| 2003/0076802 A1* | 4/2003 | Cooley et al. ................. | 370/336 |
| 2007/0217524 A1* | 9/2007 | Wang et al. ................... | 375/260 |
| 2007/0274258 A1* | 11/2007 | Cooley et al. ................. | 370/329 |
| 2010/0054237 A1 | 3/2010 | Han et al. | |
| 2010/0061493 A1* | 3/2010 | Takahashi et al. ............ | 375/343 |
| 2010/0157906 A1 | 6/2010 | Yang et al. | |
| 2010/0273474 A1 | 10/2010 | Carmon et al. | |
| 2011/0171949 A1 | 7/2011 | Liao et al. | |
| 2012/0052855 A1 | 3/2012 | Soliman et al. | |
| 2012/0094652 A1* | 4/2012 | Kilgour ..................... | 455/422.1 |

FOREIGN PATENT DOCUMENTS

WO   WO2011063044 A1   5/2011

OTHER PUBLICATIONS

Mehrpouyan, et al., "A New Distributed Approach for Achieving Clock Synchronization in Heterogeneous Networks," This paper appears in IEEE GLOBECOM 2011, 5 pages.
Peng, et al., "MS-Assisted Receiver-Receiver Time Synchronization Strategy for Femtocells," 2011 IEEE 73rd Vehicular Technology Conference (VTC Spring), Budapest, Hungary, May 15-18, 2011, 5 pages.
International Search Report and Written Opinion—PCT/US2013/032450—ISA/EPO—Jul. 3, 2013.

\* cited by examiner

*Primary Examiner* — Danh Le
(74) *Attorney, Agent, or Firm* — Jeffrey D. Jacobs

(57) ABSTRACT

A mobile device provides first information to an access point over an out-of-band wireless link. The access point uses the first information to coarsely synchronize with a macrocell base station. The access point transmits a low power pilot signal that is formed using a pseudo-random noise (PN) sequence. The mobile device uses the out-of-band wireless link to provide second information to the access point that indicates a PN phase of the pilot signal with respect to a reference time point. The access point uses the second information to finely synchronize with the macrocell base station. The mobile device communicates with a mobile operator core network through the access point using an in-band wireless link to the access point. The mobile device compensates for propagation delay when obtaining time information. The mobile device provides additional information to the access point, which the access point uses to adjust for continued clock drift.

32 Claims, 28 Drawing Sheets t: CDMA system time in chips at MD (obtained by the macro BS)
τ: Coarse estimate of the CDMA system time (in chips) at AP
$\theta_{MD}$: Pilot PN phase of AP measured by the MD
$\theta_{AP}$: Pilot PN phase of AP
N: period of the PN sequence in chips (32,786 chips)

ACCESS POINT SYNCHRONIZATION WITH COOPERATIVE MOBILE DEVICES

FIELD

Aspects of the present disclosure relate generally to wireless communication networks, devices, and methods and, more specifically, to access points and cooperative mobile devices.

BACKGROUND

Mobile devices, such as cellular phones, smartphones, and the like, typically connect to macrocell base stations to make calls and/or transfer data. In order to improve cellular coverage and increase network capacity, there has recently been a trend toward placing femtocell access points in locations that traditionally have poor cellular coverage, such as inside homes, offices, and other buildings. A femtocell access point connects to a wired network and provides wireless access for mobile devices.

Femtocell access points are typically required to be synchronized to a system time that is used by other network entities, e.g. macrocell base stations. In systems that use Code Division Multiple Access (CDMA), the synchronization is to a system time that is an absolute reference. The synchronization requirement is stringent for synchronous networks, such as CDMA2000 1x, CDMA2000 Evolution Data Optimized (EV-DO), and the like. For such networks, the notion of system time is particularly relevant. The system time is typically measured by a number of seconds that have elapsed since a time origin, such as a number of seconds that have elapsed since the time origin of Jan. 6, 1980, at 00:00:00 UTC, which is the same time origin used by the global positioning system (GPS).

The synchronization of a femtocell access point with macrocell base stations is important for performing hand-offs of mobile devices from the femtocell access point to other access points or macrocell base stations. Existing synchronization methods suffer from many problems, such as having low accuracy, coverage problems, or high cost.

SUMMARY

One or more mobile devices cooperate with an access point to perform one or more functions for the access point. In various aspects, the one or more mobile devices cooperate with the access point to aide the access point in synchronizing with a macrocell base station. A method performed by a mobile device in accordance with an aspect includes (i) providing first information to an access point over an out-of-band wireless link, where the first information is usable by the access point to coarsely synchronize with a macrocell base station; (ii) providing second information to the access point over the out-of-band wireless link, where the second information is usable by the access point to finely synchronize with the macrocell base station; and (iii) communicating with a mobile operator core network through the access point using an in-band wireless link to the access point. In such a method, the mobile device provides information to the access point that is usable by the access point to synchronize with the macrocell base station, which allows for the access point to be assisted by the mobile device to synchronize with the macrocell base station.

Before being initially synchronized with the macrocell base station, the access point may communicate with the mobile device over an out-of-band wireless link. The out-of-band wireless link may be, for example, a WiFi™ link, a Bluetooth™ link, or the like. The out-of-band wireless link is disjoint in frequency from an in-band wireless link. As an example, the in-band wireless link uses one or more frequencies that are within a set of frequency ranges designated for cellular phone network use for communications with base stations connected to a mobile operator core network, and the out-of-band wireless link uses one or more frequencies that are outside of the set of frequency ranges designated for cellular phone network use. Thus, in accordance with various aspects, the access point can receive information for performing initial synchronization from a mobile device over an out-of-band wireless link.

In an aspect, the mobile device makes measurements of signals from both the access point and the macrocell base station to determine information to be transmitted to the access point to be used for synchronization. In an aspect, the mobile device receives from the access point a pilot signal that is formed using a pseudo-random noise (PN) sequence, and determines a measured PN phase with respect to a reference time point. The second information provided to the access point by the mobile device over the out-of-band wireless link may then include information about the measured PN phase. Alternatively, or in addition, the second information provided to the access point by the mobile device over the out-of-band wireless link may include information about a difference between the measured PN phase and an estimate by the access point of an actual PN phase. The access point could then use the information provided by the mobile device that is based on the measured PN phase of the pilot signal to synchronize with the macrocell base station.

In various aspects, an initial synchronization of the access point is performed in two stages, which are a coarse synchronization stage and a fine synchronization stage. The mobile device may receive from the access point a pilot signal that is formed using a PN sequence that repeats periodically. The access point might be restricted from transmitting the pilot signal at a regular power level before synchronizing with the system time. In such a situation, the access point may transmit the pilot signal at a low power level that is sufficient for a mobile device to receive when the mobile device is located very close to the access point.

The first information provided to the access point by the mobile device over the out-of-band wireless link may be usable by the access point to perform the coarse synchronization to synchronize with the macrocell base station to within $\pm\frac{1}{2}$ of a period of the PN sequence. In some aspects, the second information provided to the access point by the mobile device over the out-of-band wireless link may be usable by the access point to perform the fine synchronization to synchronize with the macrocell base station to within a time deviation that is less than a synchronization requirement specified by a standard used for the in-band wireless link. In various aspects, the mobile device provides the first information over the out-of-band wireless link that is usable by the access point to perform coarse synchronization with the macrocell base station, and also provides the second information over the out-of-band wireless link that is usable by the access point to perform fine synchronization with the macrocell base station.

There are various ways in accordance with various aspects for the access point to obtain information for performing coarse synchronization with the macrocell base station. One option is for the mobile device to transfer time information to the access point over the out-of-band wireless link. Another option is for the access point to acquire timing information by sniffing uplink transmissions from the mobile device to the macrocell base station. A further option is for the mobile device to perform measurements on received signals to generate measurement report messages and to provide the measurement report messages to the access point over the out-of-band wireless link, where information in the measurement reports can be used by the access point to perform the coarse synchronization.

In various aspects, the mobile device provides additional information to the access point to allow the access point to adjust for continued clock drift after the access point has been initially synchronized with the macrocell base station. In one method for adjusting for clock drift, the mobile device provides PN phase information to the access point over the out-of-band wireless link when the mobile device conducts an idle handoff from the macrocell base station to the access point. The PN phase information may indicate a PN phase of a pilot signal transmitted from the access point with respect to a reference time point. The access point may then use the PN phase information to adjust for clock drift.

In another method for adjusting for clock drift, the mobile device provides timing information to the access point over the out-of-band wireless link when the mobile device conducts an idle handoff from the macrocell base station to the access point. The timing information may indicate a timing difference between the macrocell base station and the access point. The access point may then use the timing information to adjust for clock drift.

In another method for adjusting for clock drift, the mobile device performs an idle handoff from the access point to the macrocell base station when a transmitter of the access point is switched from on to off. The mobile device then synchronizes with the macrocell base station after performing the idle handoff, and provides synchronization information to the access point after the transmitter of the access point is switched back on. The synchronization information is usable by the access point to adjust for a timing difference between the macrocell base station and the access point.

In another method for adjusting for clock drift, the mobile device obtains GPS timing information in response to a request received from the access point, and then determines a PN phase of a pilot signal transmitted from the access point with respect to a reference time point identified using the GPS timing information. The mobile device then reports the PN phase to the access point, which can use the PN phase information to adjust for clock drift.

In yet another method for adjusting for clock drift, the mobile device conducts inter-frequency measurements on one or more frequencies that are not being used by the access point in response to a request from the access point. The mobile device then adjusts a timing of the mobile device to a timing of the macrocell base station while conducting the inter-frequency measurements, and determines a PN phase of a pilot signal transmitted from the access point with respect to a reference time point after adjusting the timing of the mobile device. The mobile device can then report the PN phase to the access point over the out-of-band wireless link, and the access point can use the PN phase reported by the mobile device to adjust for clock drift.

In some aspects, the mobile device compensates for propagation delay when making network measurements. In various aspects, the mobile device obtains timing information from one or more signals transmitted from the macrocell base station, and adjusts the timing information to compensate for propagation delay of the one or more signals from the macrocell base station to the mobile device. The mobile device may then generate information that is provided to the access point using the adjusted timing information.

In some aspects, the mobile device performs additional Network Listen (NL) functions for the access point in addition to the assistance that the mobile device provides to the access point for synchronization. In various aspects, the mobile device performs neighborhood discovery for the access point and transmits neighborhood discovery information to the access point. In various aspects, the mobile device obtains network measurements on behalf of the access point and transmits the network measurements to the access point. In various aspects, the mobile device decodes overhead channels for specific sets of primary scrambling codes and transmits the contents of the overhead messages corresponding to the primary scrambling codes to the access point.

A mobile device in accordance with an aspect includes circuitry configured to provide first information to an access point over an out-of-band wireless link, where the first information is usable by the access point to coarsely synchronize with a macrocell base station. In some aspects, the circuitry is configured to provide second information to the access point over the out-of-band wireless link, where the second information is usable by the access point to finely synchronize with the macrocell base station. Also, in some aspects, the circuitry is configured to communicate with a mobile operator core network through the access point using an in-band wireless link to the access point.

A mobile device in accordance with an aspect includes means for providing first information to an access point over an out-of-band wireless link, where the first information is usable by the access point to coarsely synchronize with a macrocell base station. In some aspects, the mobile device includes means for providing second information to the access point over the out-of-band wireless link, where the second information is usable by the access point to finely synchronize with the macrocell base station. Also, in some aspects, the mobile device includes means for communicating with a mobile operator core network through the access point using an in-band wireless link to the access point.

A non-transitory processor readable storage medium in accordance with an aspect stores one or more programs that when executed by a processor of a mobile device cause the mobile device to perform a method. The method includes (i) providing first information to an access point over an out-of-band wireless link, where the first information is usable by the access point to coarsely synchronize with a macrocell base station; (ii) providing second information to the access point over the out-of-band wireless link, where the second information is usable by the access point to finely synchronize with the macrocell base station; and (iii) communicating with a mobile operator core network through the access point using an in-band wireless link to the access point.

A method performed by an access point in accordance with an aspect includes (i) using first information received from a mobile device over an out-of-band wireless link to coarsely synchronize with a macrocell base station; (ii) using second information received from the mobile device over the out-of-band wireless link to finely synchronize with the macrocell base station; and (iii) receiving data from the mobile device over an in-band wireless link and transmitting the data to a mobile operator core network.

An access point in accordance with an aspect includes circuitry configured to use first information received from a mobile device over an out-of-band wireless link to coarsely synchronize with a macrocell base station. In some aspects, the circuitry is configured to use second information received from the mobile device over the out-of-band wireless link to finely synchronize with the macrocell base station. Also, in some aspects, the circuitry is configured to receive data from the mobile device over an in-band wireless link and transmit the data to a mobile operator core network.

An access point in accordance with an aspect includes means for using first information received from a mobile device over an out-of-band wireless link to coarsely synchronize with a macrocell base station. In some aspects, the access point includes means for using second information received from the mobile device over the out-of-band wireless link to finely synchronize with the macrocell base station. Also, in some aspects, the access point includes means for receiving data from the mobile device over an in-band wireless link, and means for transmitting the data to a mobile operator core network.

A non-transitory processor readable storage medium in accordance with an aspect stores one or more programs that when executed by a processor of an access point cause the access point to perform a method. In some aspects, the method includes (i) using first information received from a mobile device over an out-of-band wireless link to coarsely synchronize with a macrocell base station; (ii) using second information received from the mobile device over the out-of-band wireless link to finely synchronize with the macrocell base station; and (iii) receiving data from the mobile device over an in-band wireless link and transmitting the data to a mobile operator core network.

DETAILED DESCRIPTION

Figure 1:
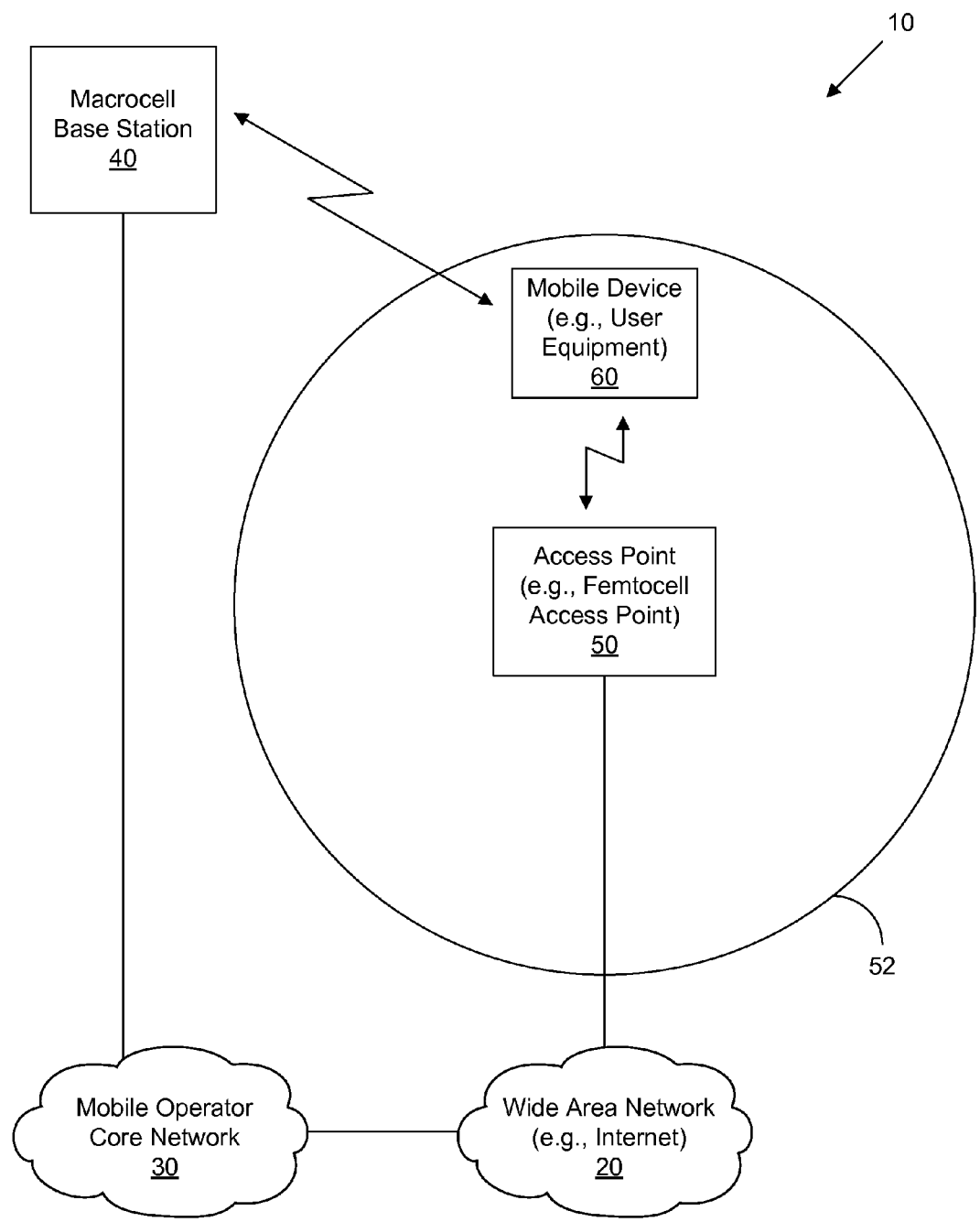
FIG. 1 illustrates a heterogeneous wireless communication system including a macrocell base station, an access point, and a mobile device.

FIG. 1 illustrates a system 10 in accordance with an aspect. The system 10 includes a wide area network 20, a mobile operator core network 30, a macrocell base station 40, an access point 50, and a mobile device 60. The wide area network 20 is a telecommunication network such as a packet switched network, a circuit switched network, or the like, and may comprise, for example, the Internet. The mobile operator core network 30 is a network, such as a packet switched network, a circuit switched network, or the like that is operated by a mobile network operator, such as a cellular company, and that provides services, such as call control and data routing, for mobile devices. The mobile operator core network 30 is connected to the wide area network 20 to transmit data to and receive data from the wide area network 20.

The mobile operator core network 30 is also connected to macrocell base stations, such as the macrocell base station 40. The macrocell base station 40 is configured to provide for communication between mobile devices, such as the mobile device 60, and the mobile operator core network 30. The macrocell base station 40 includes equipment for wirelessly transmitting and receiving signals from mobile devices, such as the mobile device 60, and has a connection to the mobile operator core network 30 for transmitting data to and receiving data from the mobile operator core network 30. The macrocell base station 40 may provide radio coverage for a large cell area, such as, for example, a range of more than 2 km wide, and is configured to communicate with mobile devices within the coverage area.

The mobile device 60 is configured to wirelessly transmit and receive data, and may comprise, for example, user equipment such as a cellular phone, a smartphone, a handheld computing device, a tablet computer, a personal digital assistant (PDA), or the like. In some instances, the mobile device 60 may be an access terminal The mobile device 60 may be used, for example, to make telephone calls, access webpages, provide for e-mail and chat communication, or the like. The mobile device 60 can wirelessly communicate with the macrocell base station 40 when it is within range of the macrocell base station 40 and is getting sufficient reception from the macrocell base station 40. The mobile device 60 can also wirelessly communicate with other access points, such as the access point 50, or the like, when it is within range and getting sufficient reception from such access points.

The access point 50 connects to the mobile operator core network 30 through the wide area network 20, and the access point 50 is configured to wirelessly communicate with mobile devices, such as the mobile device 60, that are within a communication range of the access point 50. In FIG. 1, the communication range or coverage area of the access point 50 is illustrated by a circle labeled 52. The access point 50 may have, for example, a smaller coverage area than a coverage area of the macrocell base station 40. The access point 50 may comprise, for example, a femtocell access point, a picocell access point, a microcell access point, or the like.

The access point 50 provides coverage to allow for mobile devices, such as the mobile device 60, to transmit data to and receive data from the mobile operator core network 30. In some instances, the access point 50 is placed indoors, such as within a house, an office, or other type of building. The access point 50 provides an alternative way for the mobile device 60 to communicate with the mobile operator core network 30 in addition to the communication path through the macrocell base station 40. In some instances, the mobile device 60 may be in a location, such as inside a building, where it gets better reception from the access point 50 than from the macrocell base station 40, and the mobile device 60 may determine to communicate through the access point 50 to obtain the better reception.

The mobile device 60 cooperates with the access point 50 to perform Network Listen (NL) functions for the access point 50. The mobile device 60, which may be user equipment (UE), is configured to perform NL functions for the access point 50, such as providing information for timing synchronization, performing neighborhood discovery, providing network measurements, determining available frequencies, calculating estimated path loss, decoding overhead channels, and/or the like. Such cooperation from the mobile device 60 can be used to augment information provided by a dedicated Network Listen Module (NLM) (not shown in FIG. 1) to the access point 50 in a case where there are NL coverage issues or other problems with the NLM, or the cooperation from the mobile device 60 could be used to entirely eliminate the need for a dedicated NLM, which would reduce system cost.

Figure 2:
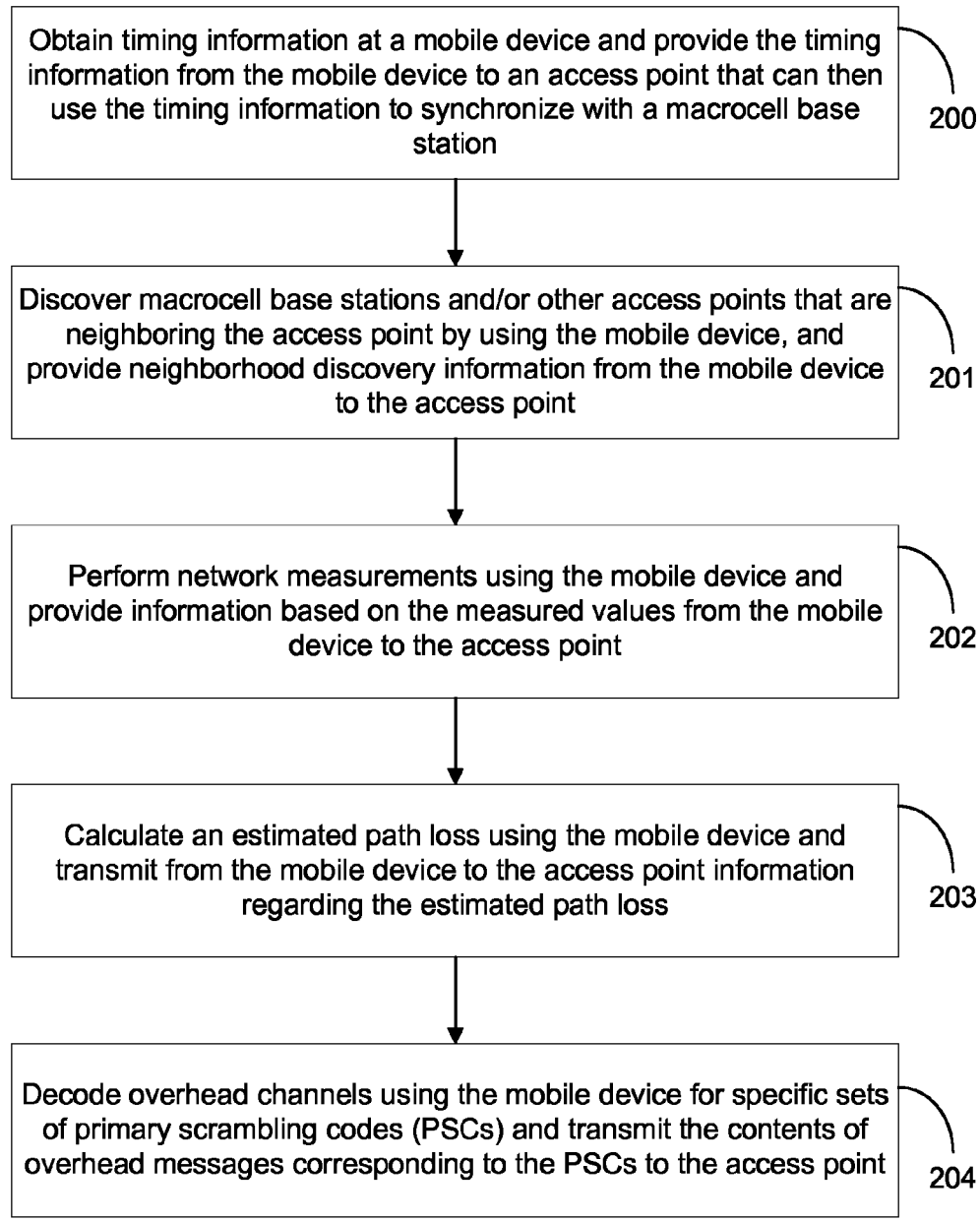
FIG. 2 illustrates a method for a mobile device to perform network listen functions on behalf of an access point.

With reference to FIGS. 1 and 2, FIG. 2 illustrates a method performed by the mobile device 60 to provide NL functions for the access point 50. The steps in the method can be performed in any order and are not limited to the ordering shown in FIG. 2. In step 200, the mobile device 60 obtains timing information and the mobile device 60 provides the timing information to the access point 50, which can then use the timing information to synchronize with the macrocell base station 40. Further details regarding the obtaining and providing of timing information from the mobile device 60 to the access point 50 for synchronization purposes are described below with reference to other figures. Referring again to FIGS. 1 and 2, in step 201 the mobile device 60 discovers macrocell base stations and/or other access points that are in the neighborhood of the access point 50, and provides neighborhood discovery information regarding the discovered base stations and/or other access points to the access point 50.

In step 202, the mobile device 60 performs network measurements and provides information based on the measured values to the access point 50. For example, in some aspects, the mobile device 60 is configured to perform network measurements to determine (i) a Received Signal Strength Indicator (RSSI) that is a measurement of power in a radio signal; (ii) an interference level (Io); (iii) a ratio of received energy per chip (Ec) to an interference level (Io) specified as Ec/Io for one or more channels, such as a Primary Common Pilot Indicator Channel (P-CPICH); and (iv) a Received Signal Code Power (RSCP) for one or more channels, such as the P-CPICH. The mobile device 60 is configured to provide the information about the network measurements, such as the determined RSSI, Io, Ec/Io, and RSCP values to the access point 50.

The mobile device 60 determines available frequencies and the mobile device 60 transmits information about the available frequencies to the access point 50. The mobile device 60 may determine the available frequencies, for example, by determining frequencies that are not being used by neighboring base stations and access points. In various aspects, the access point 50 maintains a list of neighboring macrocells and their transmission frequencies as a part of a neighbor list. Also, in various aspects, the access point 50 is allocated a different frequency than one or more neighboring macrocells to reduce inter-cell interference. In step 203, the mobile device 60 calculates an estimated path loss for one or more radio signals and transmits information about the estimated path loss to the access point 50. In step 204, the mobile device 60 decodes overhead channels for specific sets of Primary Scrambling Codes (PSCs) and transmits the contents of overhead messages corresponding to the PSCs to the access point 50.

The mobile device 60, therefore, is configured to cooperate with the access point 50 to perform Network Listen functions for the access point 50, such as the determining of timing information for synchronization purposes. The use of mobile devices such as the mobile device 60, which may be user equipment (UE) or the like, to provide timing information to an access point for synchronization purposes is herein termed "mobile device assisted synchronization." In mobile device assisted synchronization, one or more mobile devices provide information to an access point, and the access point uses the information to synchronize with a macrocell base station. Such mobile device assisted synchronization has advantages in that it can be low cost and opportunistic, and it can be used to supplement or replace other access point synchronization methods.

The mobile device assisted synchronization can be used for initial synchronization of the access point 50 and can also be used for opportunistic or periodic synchronization of the access point 50. Initial synchronization of the access point 50 occurs when the access point 50 is powered on and has not yet been synchronized to the macrocell base station 40 after being powered on. Opportunistic and/or periodic synchronization of the access point 50 occurs after the access point 50 has been initially synchronized with the macrocell base station 40, and is used to adjust for continued clock drift that occurs during operation of the access point 50.

In various aspects, the initial synchronization of the access point 50 is performed in two stages, where the first stage is a coarse synchronization stage and the second stage is a fine synchronization stage. In some implementations, the access point 50 uses a Pseudo-random Noise (PN) sequence to transmit a signal on a pilot channel. The PN sequence is repeated periodically, and the period of the PN sequence is referred to as the PN period. The PN period is typically 26.666 msec for CDMA systems. Due to the periodic nature of the PN sequence, there is a phase ambiguity in multiples of the PN period, which should be accounted for when performing the synchronization. The coarse synchronization stage can be used, for example, to synchronize the access point to within ±½ PN sequence period, which for CDMA systems would be ±13.333 msec. Such coarse synchronization eliminates the phase ambiguity of the PN sequence, because it synchronizes to within ±½ PN sequence period. The fine synchronization stage could then be used, for example, to synchronize the access point 50 to within a time deviation that is less than a synchronization requirement specified by a standard used for an in-band wireless link to the access point 50. For example, if the standard used for an in-band wireless link is a CDMA standard, then the fine synchronization stage could be used to synchronize the access point 50 with an accuracy on the order of a chip duration, which is less than 1 µs.

Figure 3:
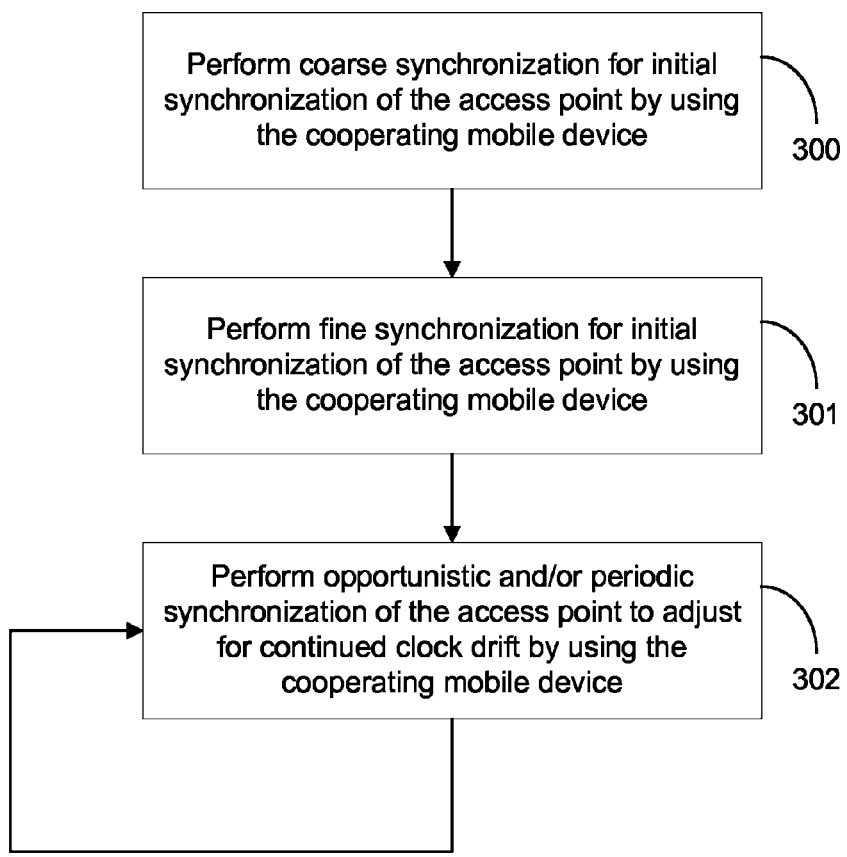
FIG. 3 illustrates a method for an access point to perform synchronization by using a cooperating mobile device.

FIG. 3 illustrates a method in accordance with an aspect for performing synchronization. With reference to FIGS. 1 and 3, in step 300 the access point 50 performs coarse synchronization for initial synchronization of the access point 50 by using information received from the cooperating mobile device 60. In step 301, the access point 50 performs fine synchronization for initial synchronization of the access point 50 by using information received from the cooperating mobile device 60. In an aspect, the initial synchronization occurs when the access point is powered on and has not yet been synchronized with the macrocell base station 40. In step 302, the access point 50 performs opportunistic and/or periodic synchronization of the access point 50 to adjust for continued clock drift by using information received from the cooperating mobile device 60.

There are various ways to achieve coarse synchronization at the access point 50 using nearby mobile devices, such as the mobile device 60, that are associated with neighboring macrocell base stations, such as the macrocell base station 40. A first option for coarse synchronization is to transfer time information from the mobile device 60 to the access point 50 via an out-of-band (OOB) link, such as a Wi-Fi™ link that provides communication in accordance with the IEEE 802.11 family of standards, a Bluetooth™ link, or the like, or over any form of Internet Protocol (IP) connection. A second option for coarse synchronization is to have the access point 50 acquire timing information via sniffing of an uplink of the mobile device 60 in which the access point 50 sniffs uplink channels of the mobile device 60 to extract frame timing on an uplink of the mobile device 60 to the macrocell base station 40, and then have the access point 50 use the timing information to infer downlink timing of the macrocell base station 40. A third option for coarse synchronization is to provide measurement report messages from the mobile device 60 to the access point 50 and then have the access point 50 perform timing synchronization using the measurement report messages. Such measurement report messages may indicate a computed time offset between a macrocell reference timing and an access point timing and, thus, may be subject to a phase ambiguity.

In various implementations, the fine synchronization stage commences after the coarse synchronization has been completed. To perform the fine synchronization in some implementations, the access point 50 starts to transmit a pilot signal, and preferably no other channels, at low power. The pilot signal is formed using a PN sequence, and the access point purposefully offsets the PN sequence a number of chips to transmit the pilot signal with a PN phase of what the access point (AP) thinks is a phase of $\theta_{AP}$ from a reference time point. However, since the access point is not yet fully synchronized with the macrocell base station 40, the reference time point used by the access point 50 is likely off from the actual reference time point used by the macrocell base station 40. A mobile device (MD), such as the mobile device 60, communicates with the macrocell base station 40 to synchronize with the macrocell base station 40. The mobile device 60 then receives the pilot signal from the access point 50 and determines a measured PN phase ($\theta_{MD}$) of the pilot signal. The mobile device 60 then provides its measurement of $\theta_{MD}$ to the access point 50 via an out-of-band communication link, such as a WiFi™ link, a Bluetooth™ link, or the like, or via any form of IP connection.

Once the access point 50 obtains the value $\theta_{MD}$ from the mobile device 60, the access point 50 can synchronize itself to the timing of the macrocell base station 40. To perform the synchronization, for example, the access point 50 determines a difference ($\Delta$) between the measured PN phase ($\theta_{MD}$) and the estimate at the access point 50 of the actual PN phase ($\theta_{AP}$), which indicates how far off the timing of the access point 50 is from the actual time. The access point 50 can then adjust its time based on the $\Delta$ to synchronize with the macrocell base station 40. In such an implementation, therefore, the access point 50 is able to cooperate with the mobile device 60 to obtain the value $\theta_{MD}$ from the mobile device 60, which the access point 50 can then use to adjust its own timing to become synchronized with the macrocell base station 40.

Figure 4:
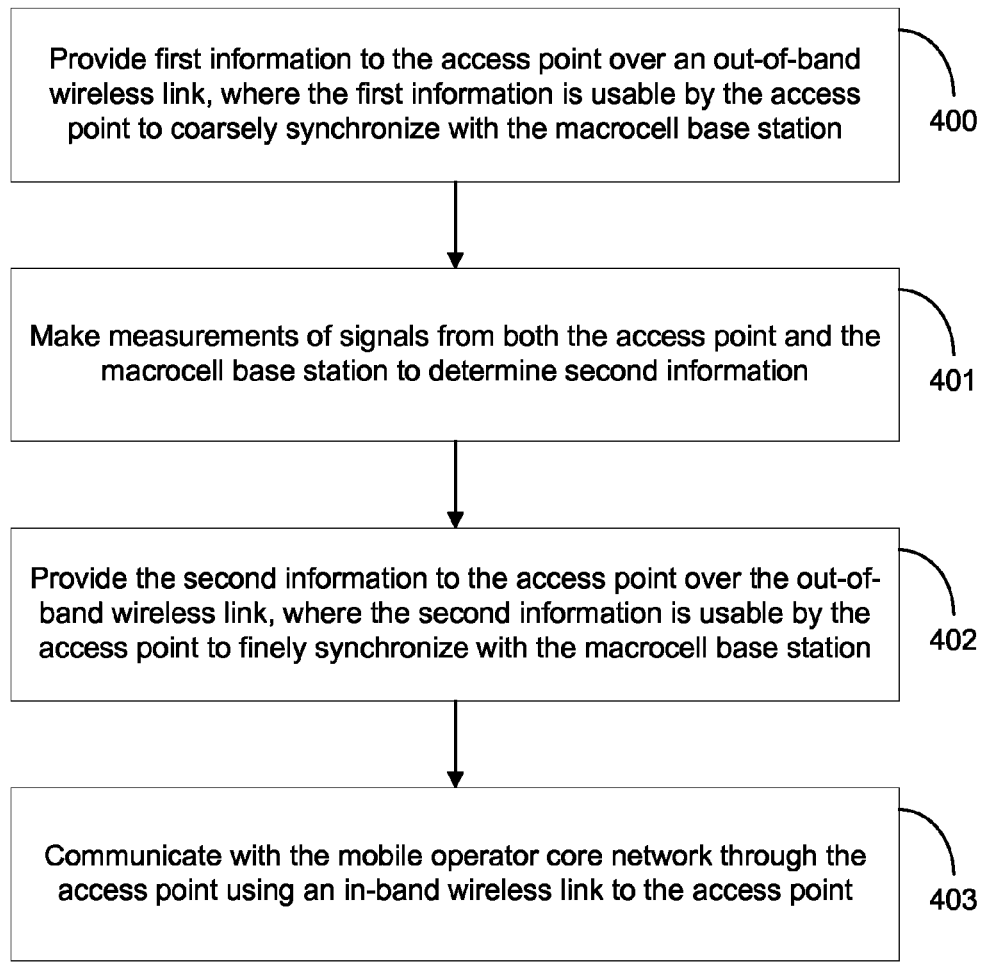
FIG. 4 illustrates a method for a mobile device to provide synchronization information to an access point over an out-of-band wireless link and to communicate through the access point using an in-band wireless link to the access point.

FIG. 4 illustrates a method in accordance with an aspect for providing information from a mobile device to an access point to assist the access point in synchronizing with a macrocell base station, and then for allowing the mobile device to communicate with the mobile operator core network through the synchronized access point. With reference to FIGS. 1 and 4, the method is performed by a mobile device, such as the mobile device 60. In step 400, the mobile device 60 provides first information to the access point 50 over an out-of-band wireless link, where the first information is usable by the access point 50 to coarsely synchronize with the macrocell base station 40. In step 401, the mobile device 60 makes measurements of signals from both the access point 50 and the macrocell base station 40 to determine second information. In step 402, the mobile device 60 provides the second information to the access point 50 over the out-of-band wireless link, where the second information is usable by the access point 50 to finely synchronize with the macrocell base station 40. In step 403, the mobile device 60 communicates with the mobile operator core network 30 through the access point 50 using an in-band wireless link to the access point 50.

In various aspects, the in-band wireless link uses one or more frequencies that are within a set of frequency ranges designated for cellular phone network use for communications with base stations connected to the mobile operator core network 30. Also, in various aspects, the out-of-band wireless link uses one or more frequencies that are outside of the set of frequency ranges designated for cellular phone network use.

In various aspects, the in-band wireless link uses one or more frequencies that are within a set of frequency ranges designated for communications performed according to at least one of (i) the Global System for Mobile Communications (GSM) standards; (ii) the Wideband Code Division Multiple Access (W-CDMA) standard; (iii) the Interim Standard 95 (IS-95); (iv) the CDMA2000 standard; (v) the 3rd generation mobile telecommunications (3G) standards; and/or (vi) the 4th generation mobile telecommunications (4G) standards. For example, in some aspects, the in-band wireless link may use one or more frequencies that are within a set of frequency ranges such as (i) 698-806 MHz (ii) 806-824 MHz; (iii) 851-869 MHz; (iv) 824-849 MHz; (v) 869-894 MHz; (vi) 1710-1755 MHz; (vii) 1850-1910 MHz; (viii) 1930-1990 MHz; (ix) 2110-2155 MHz; and/or (x) 2496-2690 MHz.

In various aspects, the out-of-band wireless link uses one or more frequencies that are within a set of frequencies designated for a Wi-Fi™ link that provides communication in accordance with the IEEE 802.11 family of standards, a Bluetooth™ link, or the like. For example, in some aspects, the out-of-band wireless link may use one or more frequencies that are within a set of frequency ranges such as (i) 2400-2483.5 MHz; (ii) 5150-5350 MHz; (iii) 5470-5725 MHz; (iv) 2-11 GHz; and/or (v) 10-66 GHz. In various aspects, the out-of-band wireless link is usable for communications between the mobile device 60 and the access point 50 both before and after the access point 50 has been synchronized with the macrocell base station 40.

Figure 5:
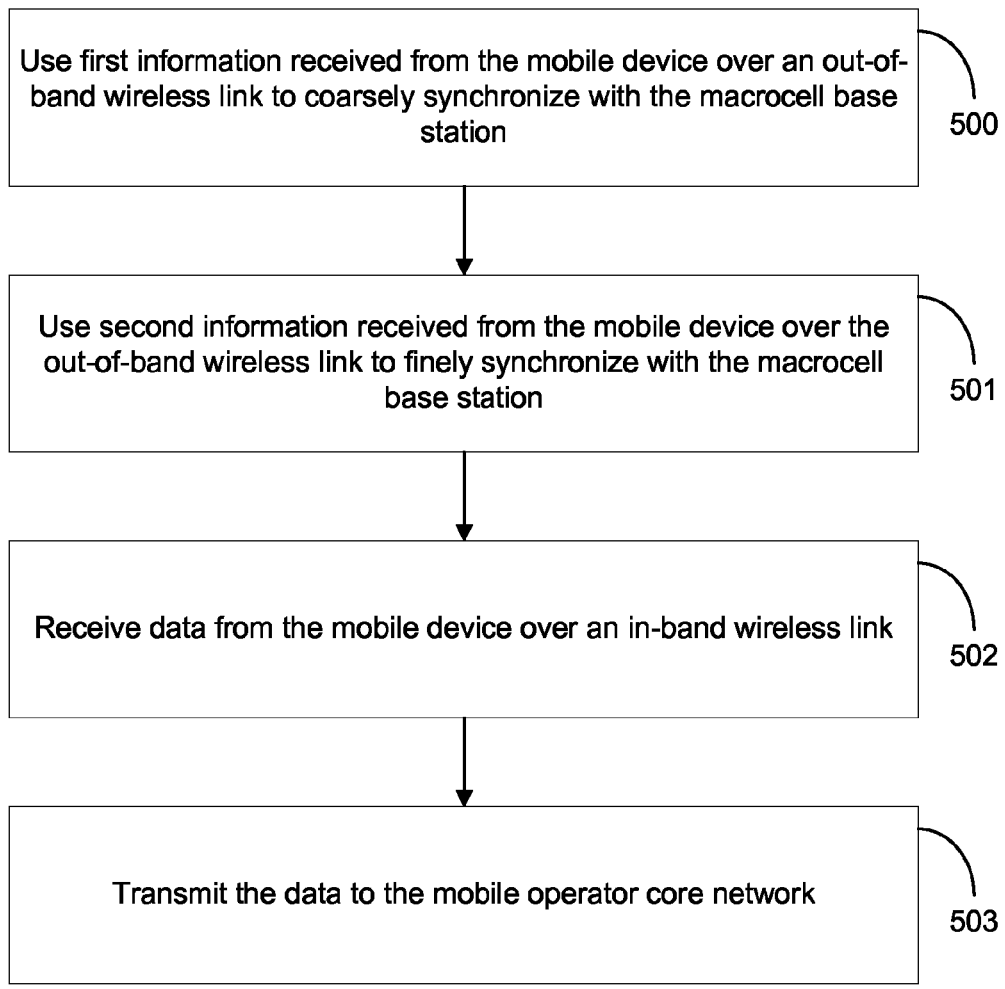
FIG. 5 illustrates a method for an access point to receive synchronization information over an out-of-band wireless link and to receive data over an in-band wireless link to be transmitted to a mobile operator core network.

FIG. 5 illustrates a method in accordance with an aspect that can be performed by an access point to synchronize with a macrocell base station and to communicate data between a mobile device and a mobile operator core network. With reference to FIGS. 1 and 5, the method is performed by an access point, such as the access point 50. In step 500, the access point 50 uses first information received from the mobile device 60 over an out-of-band wireless link to coarsely synchronize with the macrocell base station 40. In step 501, the access point 50 uses second information received from the mobile device 60 over the out-of-band wireless link to finely synchronize with the macrocell base station 40. In step 502, the access point 50 receives data from the mobile device 60 over an in-band wireless link. In step 503, the access point 50 transmits the data to the mobile operator core network 30. By using such a method, for example, the access point 50 is able to synchronize with the macrocell base station 40 using information received from the mobile device 60 over an out-of-band wireless link, and then the mobile device 60 is able to communicate with the mobile operator core network 30 via the access point 50 over the in-band wireless link after the access point 50 has been synchronized.

Figure 6:
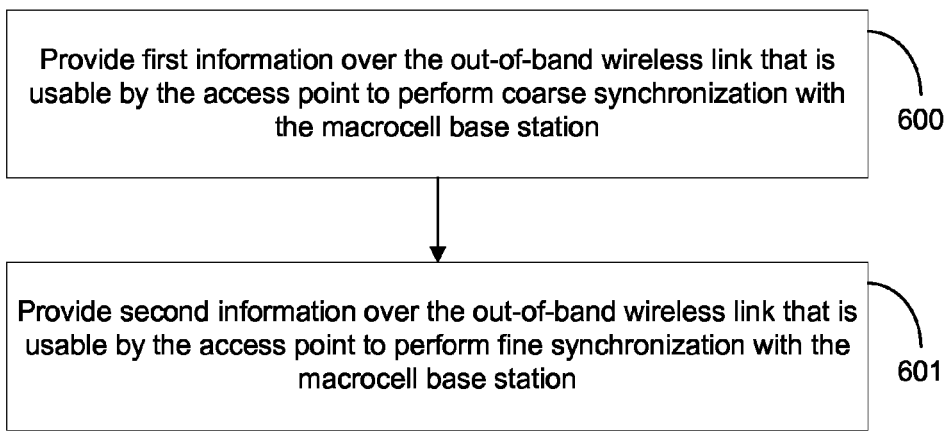
FIG. 6 illustrates a method for a mobile device to provide information to an access point for coarse and fine synchronization of the access point.

FIG. 6 illustrates a method in accordance with an aspect that can be performed by a mobile device to assist an access point with coarse and fine synchronization. With reference to FIGS. 1 and 6, the method is performed by a mobile device, such as the mobile device 60. In step 600, the mobile device 60 provides first information over the out-of-band wireless link that is usable by the access point 50 to perform coarse synchronization with the macrocell base station 40. In step 601, the mobile device 60 provides second information over the out-of-band wireless link that is usable by the access point 50 to perform fine synchronization with the macrocell base station 40. By using such a method, for example, the mobile device 60 cooperates with the access point 50 to provide the access point 50 with information over an out-of-band wireless link to perform both coarse and fine synchronization.

Figure 7:
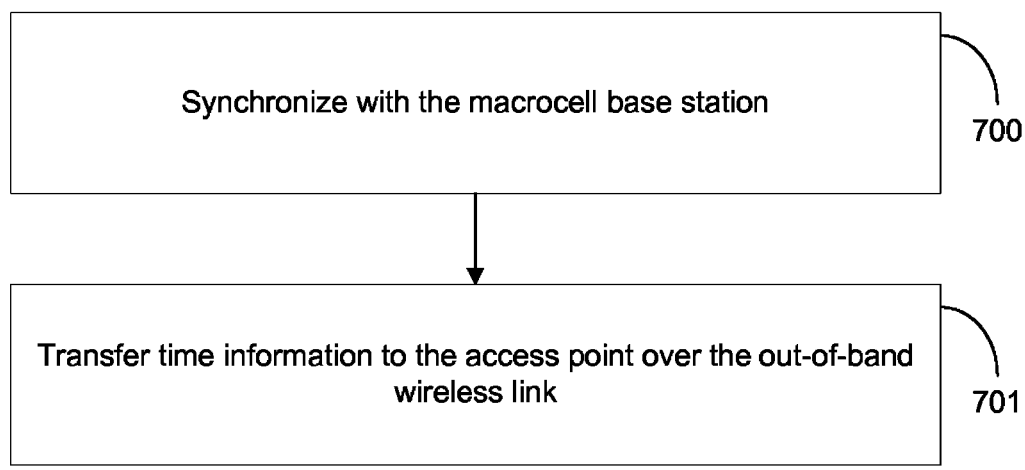
FIG. 7 illustrates a method for a mobile device to provide time information to an access point for synchronization of the access point.
Figure 8:
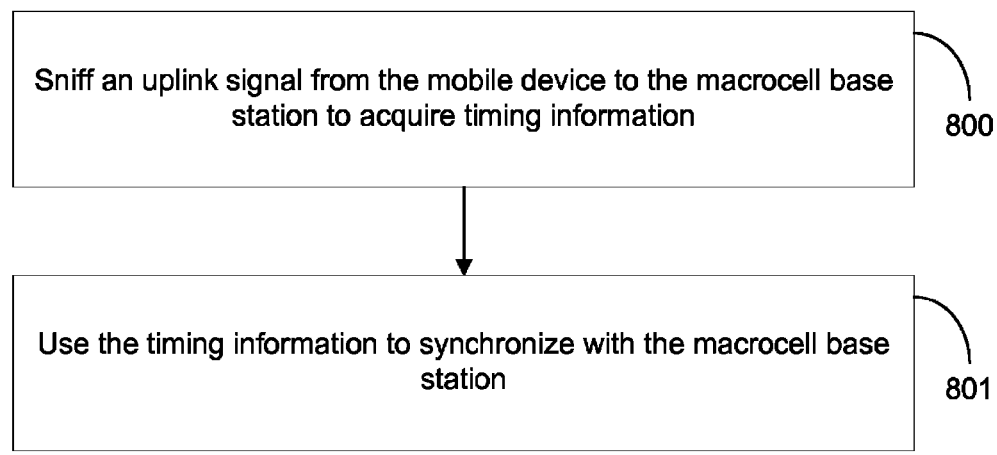
FIG. 8 illustrates a method for an access point to obtain timing information for synchronization of the access point.
Figure 9:
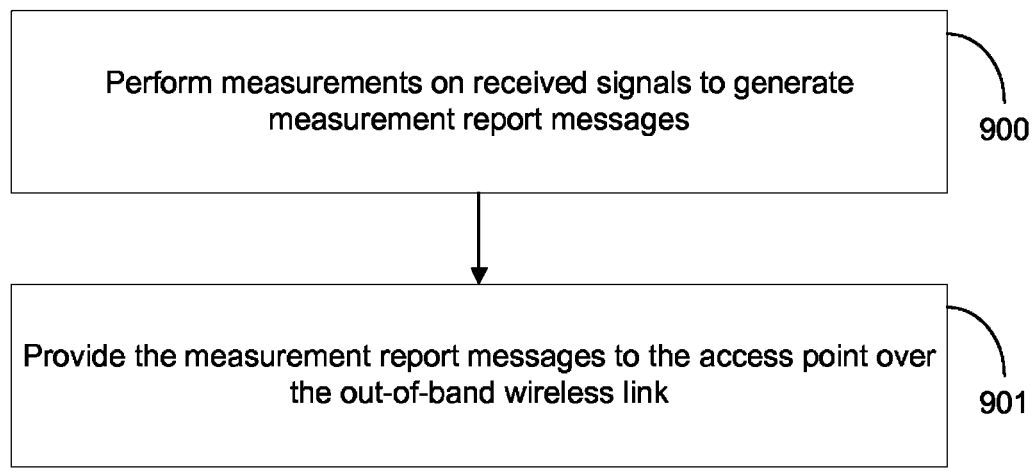
FIG. 9 illustrates a method for a mobile device to provide measurement report messages to an access point.

FIGS. 7, 8, and 9 illustrate various methods that are exemplary optional ways for an access point to obtain information to achieve coarse synchronization. With reference to FIGS. 1 and 7, the method of FIG. 7 is performed by a mobile device, such as the mobile device 60. In step 700, the mobile device 60 synchronizes with the macrocell base station 40. In step 701, the mobile device 60 transfers time information to the access point 50 over the out-of-band wireless link that can be used for the coarse synchronization. In some aspects, the mobile device 60 measures a timing offset between its wireless wide area network (WWAN) and out-of-band frame/slot timing, and propagates the offset to the access point 50 over the out-of-band link. The access point 50 may then perform coarse synchronization using the information provided from the mobile device 60. In some aspects, the access point 50 corrects for the timing offset reported by the mobile device 60. The mobile device 60 and the access point 50 may also take appropriate steps to account for and correct processing, queuing, and propagation delays during the transfer of the information.

With reference to FIGS. 1 and 8, the method of FIG. 8 is performed by an access point, such as the access point 50. In step 800, the access point 50 sniffs an uplink signal from the mobile device 60 to the macrocell base station 40 to acquire timing information. In some aspects, the access point 50 sniffs the uplink channels of the mobile device 60 to extract frame timing on the uplink and infers a downlink timing for the macrocell base station 40 from the uplink frame timing. In various aspects, the access point 50 can detect locations of certain reference signals by sniffing, where the channels may be, for example, Long Term Evolution (LTE) channels such as a demodulation reference signal (DM-RS), a sounding reference signal (SRS), or the like, or Universal Mobile Telecommunications System (UMTS) channels such as a physical random access channel (PRACH), an enhanced dedicated physical data channel (E-DPDCH), or the like. In some aspects, the access point 50 is provided with aiding information to assist the access point 50 with sniffing. All or part of the aiding information can be conveyed to the access point 50 via the out-of-band link. Some parts of the aiding information can also be obtained by the access point 50 via a backhaul connection from the mobile operator core network 30, or can be obtained by the access point 50 by a network listen module (not shown in FIG. 1) hosted on the access point if the access point 50 has a network listen module. In step 801, the access point 50 uses the timing information to synchronize with the macrocell base station 40.

With reference to FIGS. 1 and 9, the method of FIG. 9 is performed by a mobile device, such as the mobile device 60. In step 900, the mobile device 60 performs measurements on received signals to generate measurement report messages. In step 901, the mobile device 60 provides the measurement report messages to the access point 50 over the out-of-band wireless link, and the access point 50 can use the measurement reports to perform coarse synchronization. In some aspects, the mobile device 60 sends measurement report messages (MRMs) to a radio network controller (RNC) when it detects a primary scrambling code (PSC) of the access point 50, where an MRM includes the PSC and ΔFN (Frame Number) for both the macrocell base station 40, which may be a Macro Node-B (MNB), and the access point 50, which may be a Home Node-B (HNB). The timing offset between the macrocell base station 40 and the access point 50 may then be determined by the mobile device 60 to be the difference $(\Delta FN_{MNB} - \Delta FN_{HNB})$. The mobile device 60 can then send the difference to the access point 50 via the out-of-band link or via the mobile operator core network 30, and the access point 50 can then correct its timing by adjusting for the offset specified by the difference.

Figure 10:
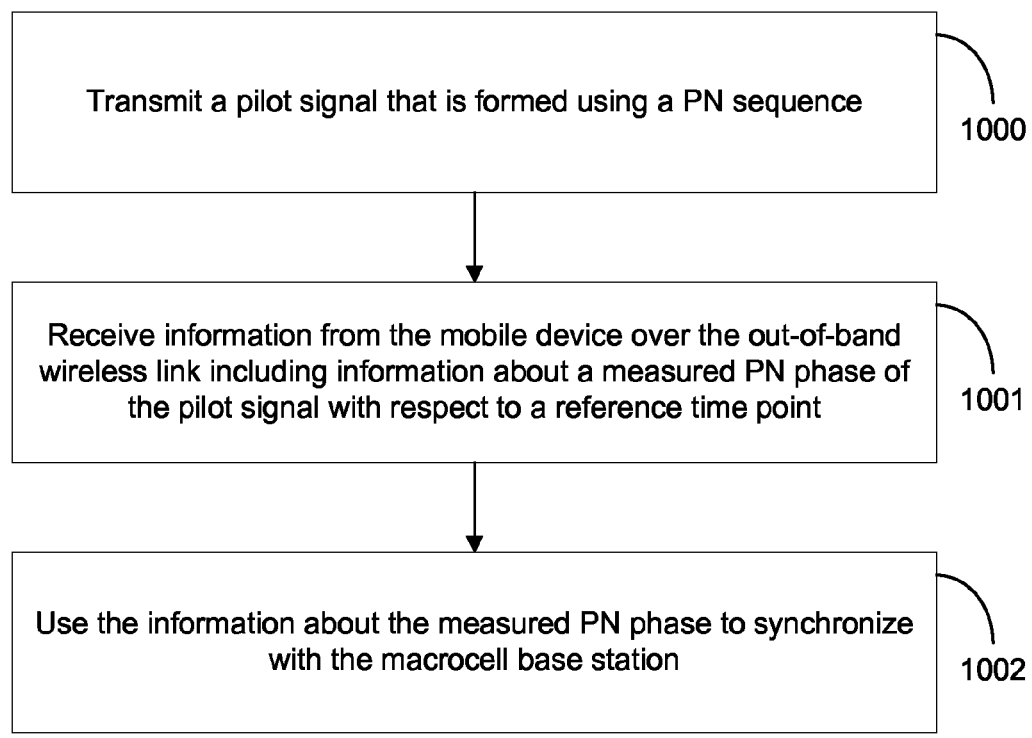
FIG. 10 illustrates a method for an access point to transmit a pilot signal and receive information from a mobile device based on the pilot signal to be used for synchronization of the access point.

FIG. 10 illustrates a method in accordance with an aspect for an access point to receive information from a cooperating mobile device to allow the access point to perform fine synchronization. With reference to FIGS. 1 and 10, the method is performed by an access point, such as the access point 50. In step 1000, the access point 50 transmits a pilot signal that is formed using a PN sequence. In step 1001, the access point 50 receives information from the mobile device 60 over the out-of-band wireless link including information about a measured PN phase of the pilot signal with respect to a reference time point. In step 1002, the access point 50 uses the information about the measured PN phase to synchronize with the macrocell base station 40.

Figure 11:
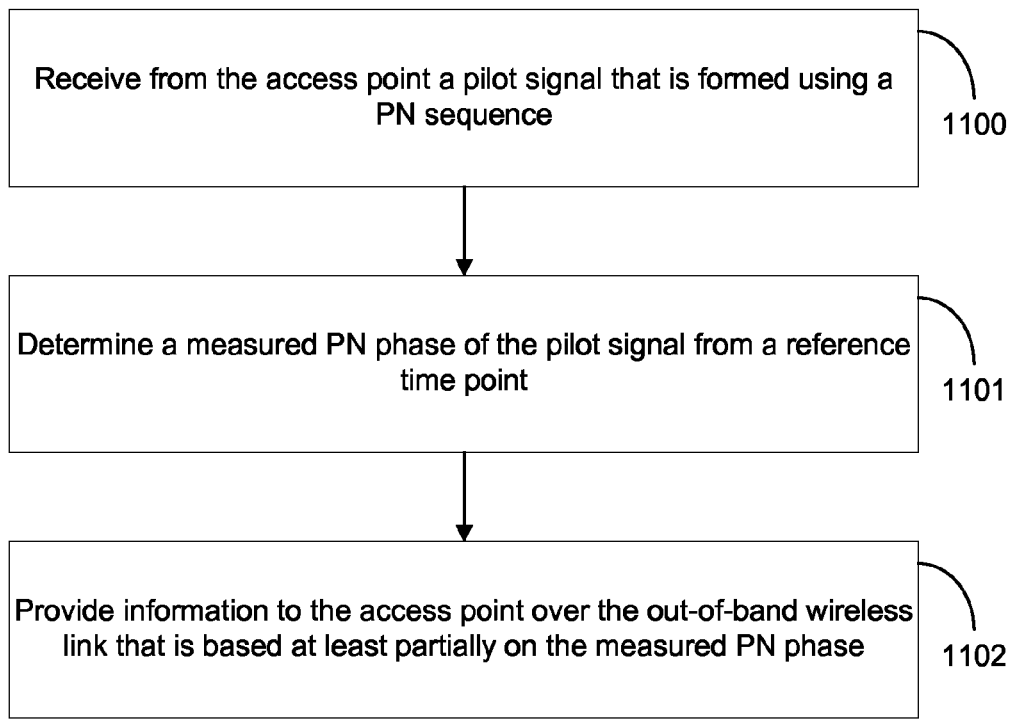
FIG. 11 illustrates a method for a mobile device to receive a pilot signal from an access point and provide information to the access point that is based on the pilot signal.

FIG. 11 illustrates a method in accordance with an aspect for a mobile device to cooperate with an access point to provide the access point with information to allow the access point to perform fine synchronization. With reference to FIGS. 1 and 11, the method is performed by a mobile device, such as the mobile device 60. In step 1100, the mobile device 60 receives from the access point 50 a pilot signal that is formed using a PN sequence. In step 1101, the mobile device 60 determines a measured PN phase of the pilot signal from a reference time point. In step 1102, the mobile device 60 provides information to the access point 50 over the out-of-band wireless link that is based at least partially on the measured PN phase. The access point 50 can then use the information to perform fine synchronization.

As discussed above, in various aspects, one of the Network Listen functions performed by the mobile device 60 is to cooperate with the access point 50 to allow the access point 50 to adjust its timing to synchronize with the macrocell base station 40. The access point 50 uses a PN sequence to transmit a signal on a pilot channel. The PN sequence is repeated periodically, and the period of the PN sequence is referred to as the PN period. In CDMA systems, for example, the PN period is typically 26.666 msec. The period of the PN sequence in chips is denoted "N". In CDMA systems, for example, the period of the PN sequence is typically 32,786 chips. In various aspects, the mobile device 60 cooperates with the access point 50 to synchronize the access point 50 in two stages, which are (1) a coarse synchronization stage in which a timing between the access point 50 and the mobile device 60 is synchronized to within "$T_{PN}/2$", where $T_{PN}$ is a period of the PN sequence; and (2) a fine synchronization stage in which the timing of the access point 50 is synchronized to within a time deviation that is less than a synchronization requirement specified by a standard used for an in-band wireless link. $T_{PN}$ in a CDMA system may be 26.666 msec, and the fine synchronization may allow for the timing of the access point 50 to be synchronized to within 1 μs of actual time by leveraging the pilot PN phase measurement capability of the mobile device 60.

After performing the coarse synchronization, the mobile device 60 and the access point 50 cooperate to perform the fine synchronization. In various aspects, the fine synchronization is performed both (1) initially when the access point 50 is first being synchronized; and then (2) continuously and/or opportunistically thereafter to maintain synchronization and adjust for clock drift. In various aspects, the synchronization is to a system time that is an absolute time reference. In various aspects, a time origin is defined as Jan. 6, 1980, at 00:00:00 UTC, and a time is defined in seconds since the time origin. In some aspects, time is counted in chips rather than in seconds. In various aspects, a pilot PN offset is specified as a pilot PN sequence offset of a given sector in units of 64 chips. Also, in various aspects, a pilot PN phase is specified as a pilot PN sequence offset of a given sector in units of PN chips.

Figure 12:
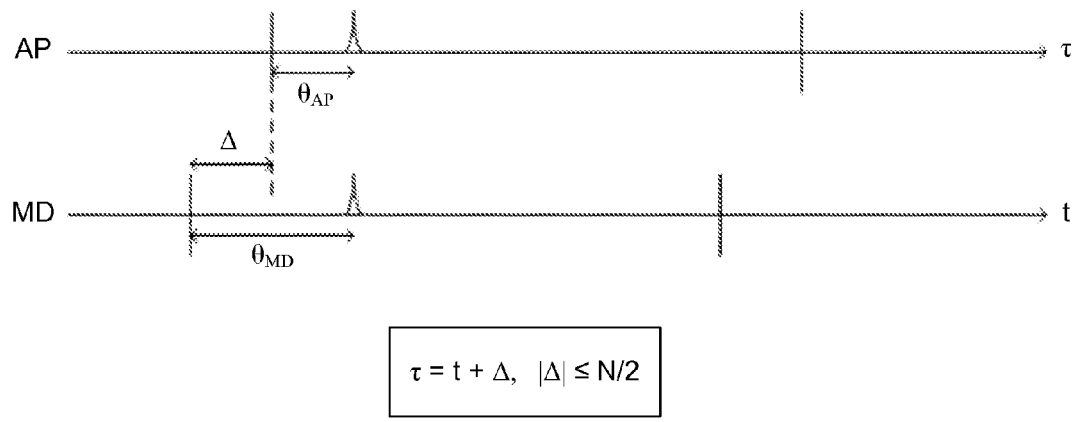
FIG. 12 illustrates a timing diagram showing phase information.

Timing diagrams to aid in an explanation of the synchronization are shown in FIGS. 12, 13, 14, 15, and 16. With reference to FIGS. 1 and 12, in various aspects to perform the initial fine synchronization, the access point 50 starts to transmit a pilot signal (but no other channels) at low power. The pilot signal is formed using the PN sequence, and the access point 50 purposefully offsets the PN sequence a number of chips to transmit the pilot signal with a PN phase of what the access point 50 thinks is a phase of $\theta_{AP}$ from a reference time point, which is shown on the timeline for the access point 50 (AP) in FIG. 12. However, since the access point 50 is not yet fully synchronized with the macrocell base station 40, the reference time point used by the access point 50 is likely off from an actual reference time point used by the macrocell base station 40. The mobile device 60, which in various aspects can be an access terminal, communicates with the macrocell base station 40 to synchronize with the macrocell base station 40. The mobile device 60 (MD) then receives the pilot signal from the access point 50 and determines a measured PN phase ($\theta_{MD}$) of the pilot signal received from the access point 50, which is shown on the timeline for the MD in FIG. 12. In various aspects, the mobile device 60 then provides its measurement of $\theta_{MD}$ to the access point 50 via an out-of-band communication link, such as a Wi-Fi™ or Bluetooth™ link.

In various aspects, once the access point 50 obtains the value $\theta_{MD}$ from the mobile device 60, the access point 50 can synchronize itself to the timing of the macrocell base station 40. To perform the synchronization, the access point 50 determines a difference ($\Delta$), as shown in FIG. 12, between the measured PN phase ($\theta_{MD}$) and the estimate by the access point 50 of the actual PN phase ($\theta_{AP}$), where the difference $\Delta$ indicates how far off the timing of the access point 50 is from the actual time. The access point 50 can then adjust its time by $\Delta$ to synchronize with the macrocell base station 40. According to the above exemplary operations, therefore, the access point 50 is able to cooperate with the mobile device 60 to obtain the value $\theta_{MD}$ from the mobile device 60, which the access point 50 can then use to adjust its own timing to become synchronized with the macrocell base station 40.

Figure 13:
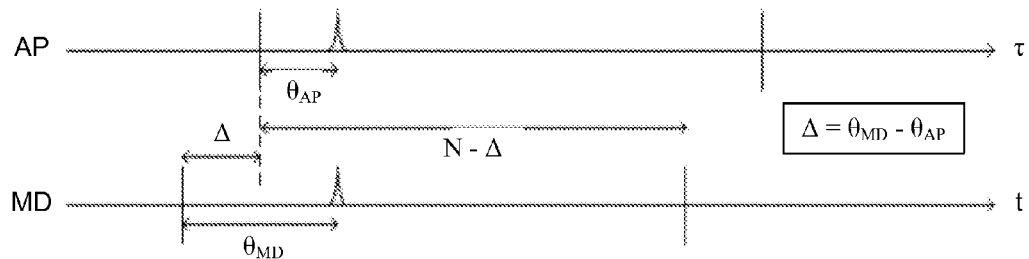
FIG. 13 illustrates a timing diagram showing phase information for an example scenario.
Figure 14:
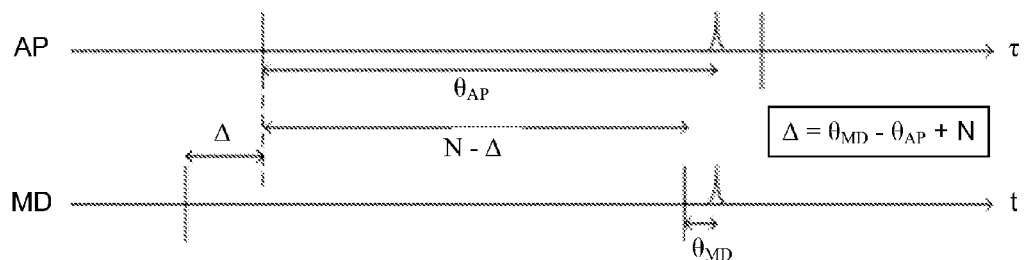
FIG. 14 illustrates a timing diagram showing phase information for another example scenario.
Figure 15:
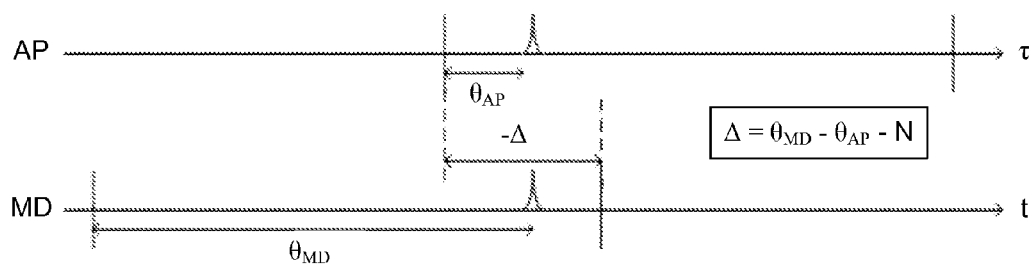
FIG. 15 illustrates a timing diagram showing phase information for another example scenario.
Figure 16:
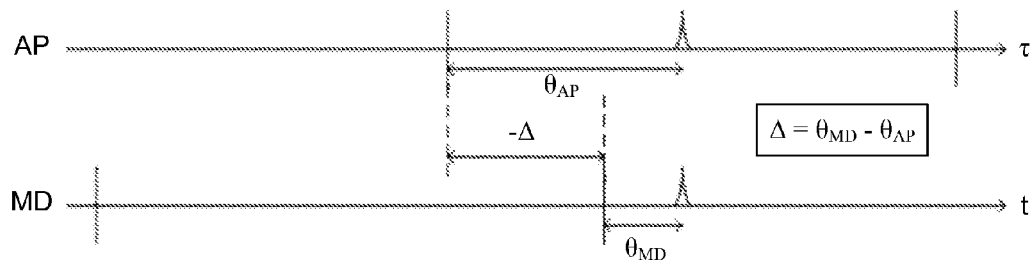
FIG. 16 illustrates a timing diagram showing phase information for another example scenario.

Since the PN sequence is a periodic sequence, in various aspects the ambiguity due to the periodic nature of the PN sequence is resolved using coarse synchronization before the fine synchronization is performed. To resolve the ambiguity in various aspects, the coarse synchronization is performed first, and the accuracy of the coarse synchronization is within ±½ PN sequence period. For example, the coarse synchronization can result in an accuracy within ±13.333 msec for a CDMA system. FIGS. 13, 14, 15, and 16 illustrate various possible relationships between $\theta_{MD}$ and $\theta_{AP}$, as well as the calculated $\Delta$ value for each possibility. In particular, there are the following five possibilities for calculating $\Delta$ for various relationships of $\theta_{MD}$ and $\theta_{AP}$:

(1) If $\theta_{MD}=\theta_{AP}$, then no adjustment is needed because the access point is already in perfect synchronization;

(2) If $0<\theta_{MD}-\theta_{AP}<N/2$, then the access point is leading by $\Delta=\theta_{MD}-\theta_{AP}$, (see, e.g., FIG. 13);

(3) If $\theta_{MD}-\theta_{AP}<-N/2$, then the access point is leading by $\Delta=\theta_{MD}-\theta_{AP}+N$, (see, e.g., FIG. 14);

(4) If $N/2<\theta_{MD}-\theta_{AP}$, then the access point is lagging by $\Delta=\theta_{MD}-\theta_{AP}-N$, ($\Delta$ is negative in this case, i.e., lagging) (see, e.g., FIG. 15); and (5) If $-N/2<\theta_{MD}-\theta_{AP}<0$, then the access point is lagging by $\Delta=\theta_{MD}-\theta_{AP}$, ($\Delta$ is negative in this case, i.e., lagging) (see, e.g., FIG. 16).

With reference to FIGS. 1 and 12, in various aspects, the mobile device 60 measures the PN phase of the access point 50 to obtain $\theta_{MD}$ and then reports $\theta_{MD}$ to the access point 50 over an out-of-band wireless link. In various aspects, the access point 50 calculates $\Delta$ and adjusts its CDMA time ($\tau$) by $\Delta$, such that $\tau_{new}=\tau-\Delta$. In such an instance, $\theta_{AP,adjusted}=(\theta_{AP}+\Delta)\mod N=\theta_{MD}$. The access point 50, therefore, is able to perform fine synchronization using information obtained from the mobile device 60.

In various aspects, once the access point 50 has been initially synchronized, the access point 50 continues to make adjustments for clock drift, where the continued adjustment schemes may involve, for example, periodic and/or opportunistic adjustments. For the adjustments there are multiple options, such as (1) whenever the mobile device 60 conducts idle handoff it reports phase or timing information to the access point 50; or (2) the access point 50 forces idle handoff of the mobile device 60 by switching off transmission from the access point 50; or (3) the access point 50 requests that the mobile device 60 acquire GPS timing and then report an observed PN phase to the access point 50; or (4) the access point 50 requests the mobile device 60 to conduct inter-frequency measurements and then report an observed PN phase to the access point 50. Those various options for continued clock drift adjustment are discussed in further detail below with reference to FIGS. 17, 18, 19, 20, 21, 22, 23, 24, and 25.

Figure 17:
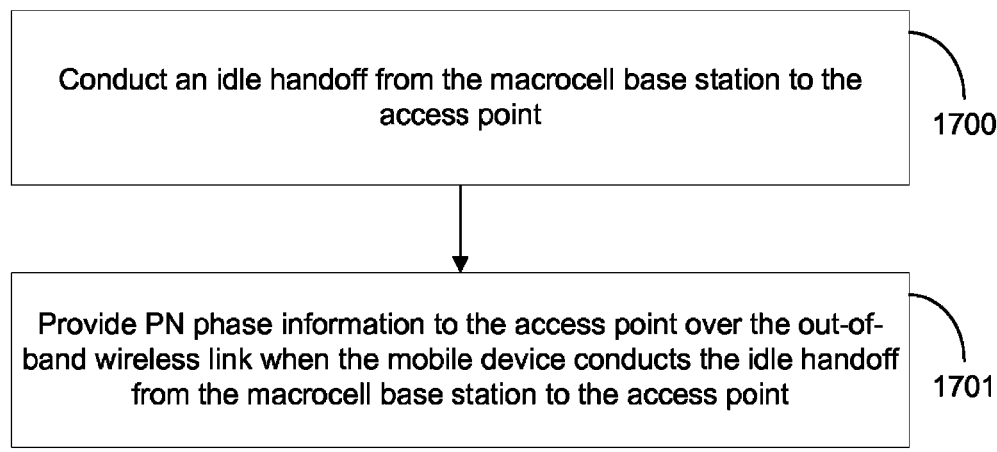
FIG. 17 illustrates a method for a mobile device to provide information to an access point when performing an idle handoff.
Figure 18:
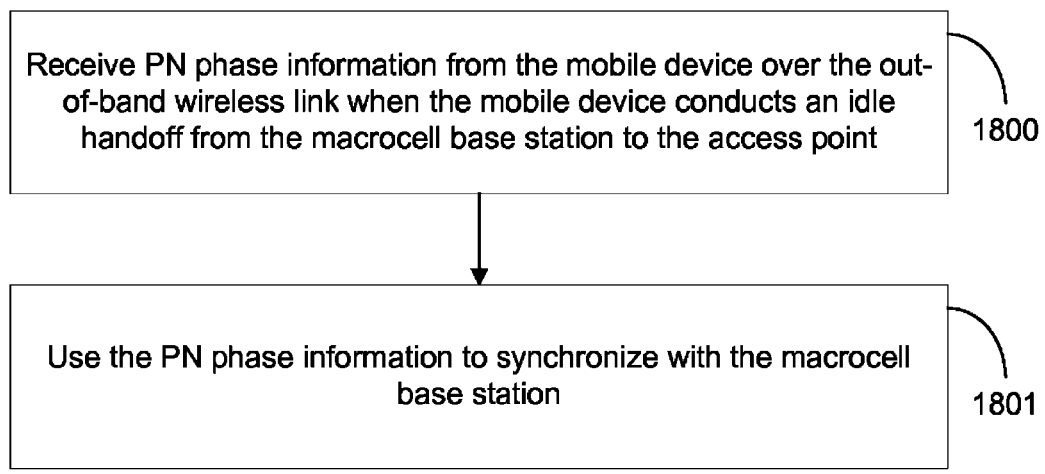
FIG. 18 illustrates a method for an access point to receive information from a mobile device for synchronization of the access point.

FIGS. 17 and 18 illustrate a first option for clock drift adjustment. FIG. 17 illustrates a method for a mobile device, and FIG. 18 illustrates a corresponding method for an access point. With reference to FIGS. 1 and 17, the method of FIG. 17 is performed by a mobile device, such as the mobile device 60. In step 1700, the mobile device 60 conducts an idle handoff from the macrocell base station 40 to the access point 50. In step 1701, the mobile device 60 provides PN phase information to the access point 50 over the out-of-band wireless link when the mobile device 60 conducts the idle handoff from the macrocell base station 40 to the access point 50. With reference to FIGS. 1 and 18, the method of FIG. 18 is performed by an access point, such as the access point 50. In step 1800, the access point 50 receives PN phase information from the mobile device 60 over the out-of-band wireless link when the mobile device 60 conducts an idle handoff from the macrocell base station 40 to the access point 50. In step 1801, the access point 50 uses the PN phase information to synchronize with the macrocell base station 40.

Figure 19:
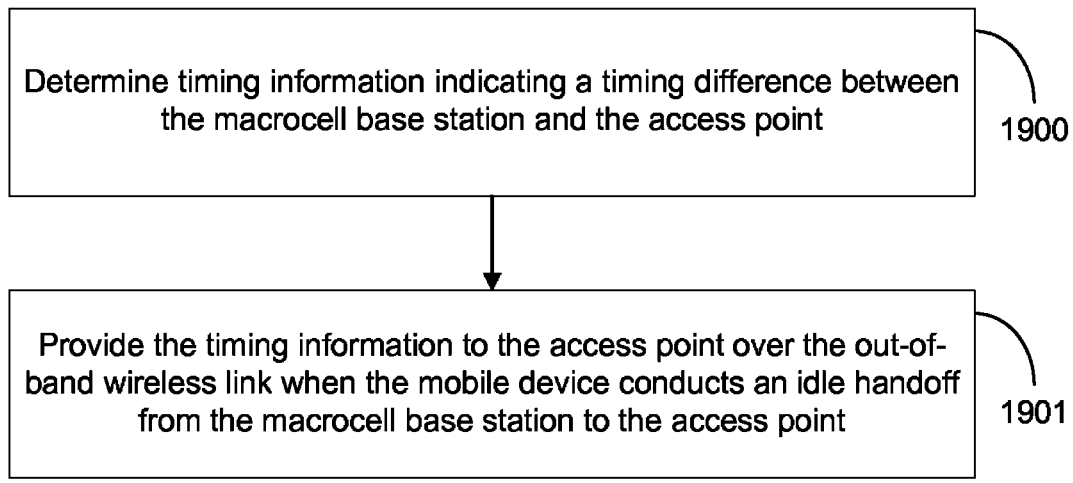
FIG. 19 illustrates a method for a mobile device to provide information to an access point when performing an idle handoff.

In various aspects in accordance with the methods of FIGS. 17 and 18, each time the mobile device 60 (refer to FIG. 1) conducts an idle handoff from the macrocell base station 40 to the access point 50, the mobile device 60 reports the PN phase information (or a timing difference between the macrocell base station 40 and the access point 50) via an out-of-band wireless link to the access point 50. In such aspects, the access point 50 then estimates the clock drift from the PN phase information and adjusts its timing to offset the difference/drift. FIG. 19 illustrates a method in accordance with an aspect in which a mobile device provides timing information to an access point. With reference to FIGS. 1 and 19, the method is performed by a mobile device, such as the mobile device 60. In step 1900, the mobile device 60 determines timing information indicating a timing difference between the macrocell base station 40 and the access point 50. In step 1901, the mobile device 60 provides the timing information to the access point 50 over the out-of-band wireless link when the mobile device 60 conducts an idle handoff from the macrocell base station 40 to the access point 50. The access point 50 can then use the timing information to adjust for clock drift.

Figure 20:
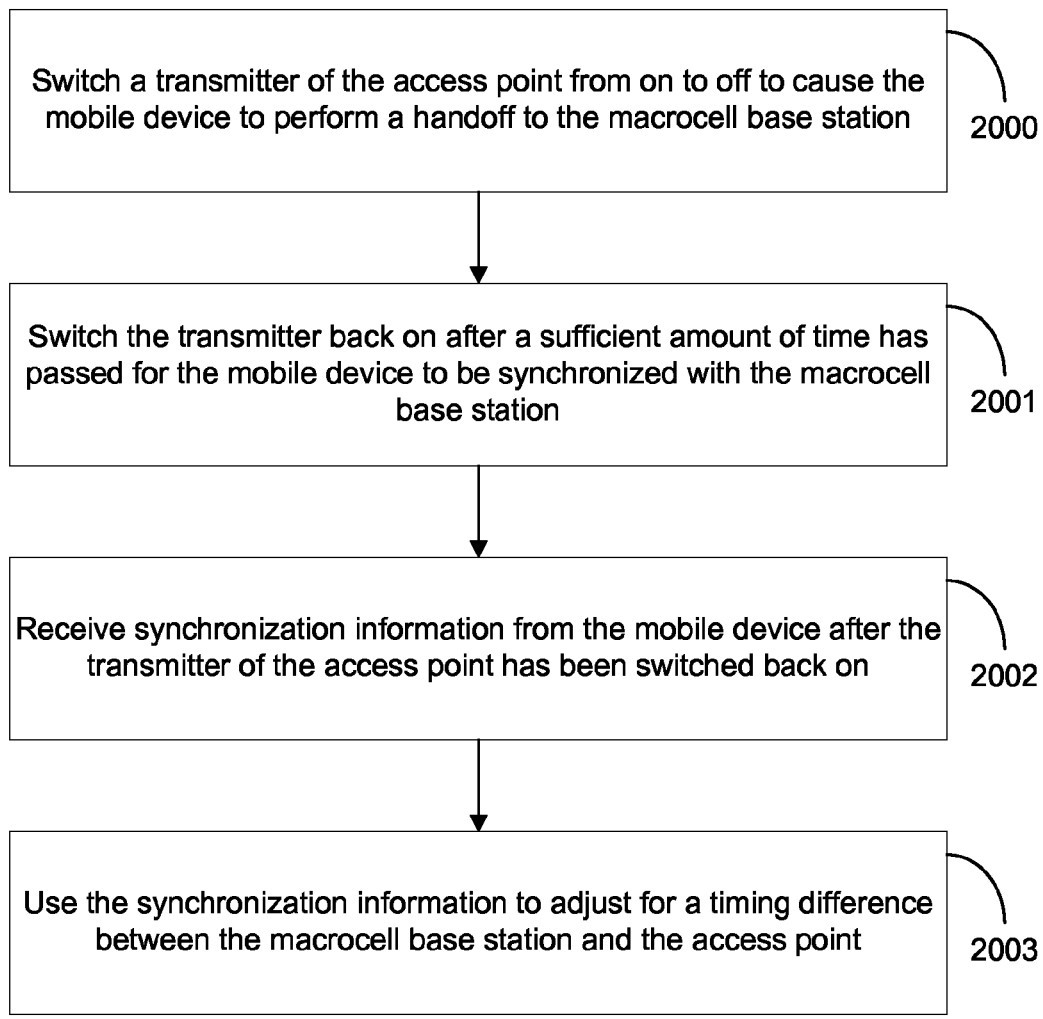
FIG. 20 illustrates a method for an access point to force a mobile device to perform a handoff to have the mobile device obtain synchronization information for the access point.
Figure 21:
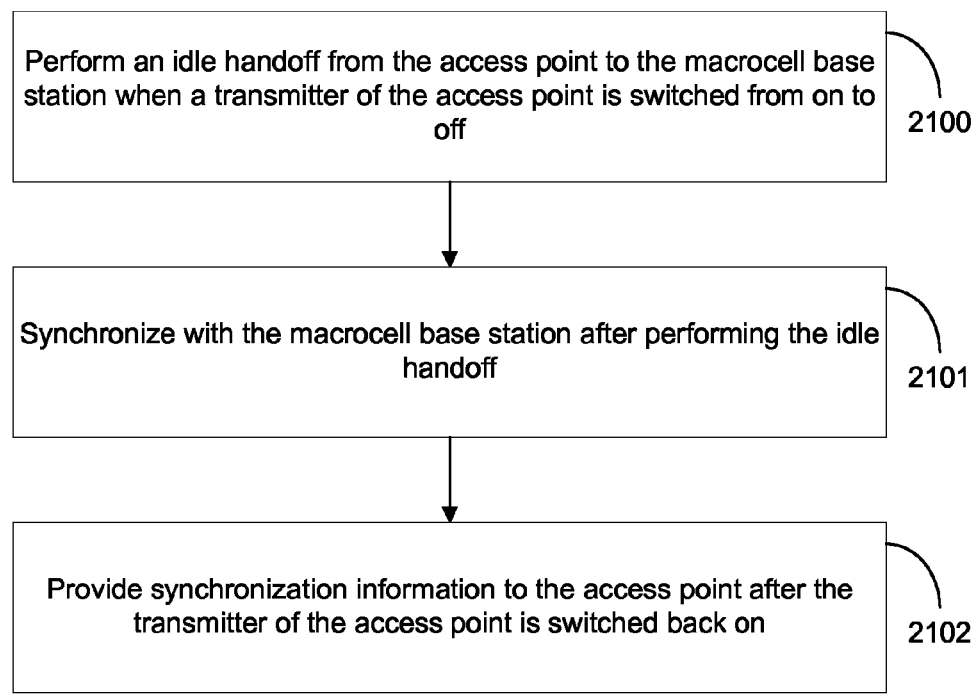
FIG. 21 illustrates a method for a mobile device to perform a handoff and obtain information to provide to an access point for synchronization of the access point.

FIGS. 20 and 21 illustrate a second option for clock drift adjustment. FIG. 20 illustrates a method for an access point, and FIG. 21 illustrates a corresponding method for a mobile device. With reference to FIGS. 1 and 20, the method of FIG. 20 is performed by an access point, such as the access point 50. In step 2000, the access point 50 switches a transmitter of the access point 50 from on to off to cause the mobile device 60 to perform a handoff to the macrocell base station 40. In step 2001, the access point 50 switches the transmitter back on after a sufficient amount of time has passed for the mobile device 60 to be synchronized with the macrocell base station 40. In step 2002, the access point 50 receives synchronization information from the mobile device 60 after the transmitter of the access point 50 has been switched back on. In step 2003, the access point 50 uses the synchronization information to adjust for a timing difference between the macrocell base station 40 and the access point 50.

With reference to FIGS. 1 and 21, the method of FIG. 21 is performed by a mobile device, such as the mobile device 60. In step 2100, the mobile device 60 performs an idle handoff from the access point 50 to the macrocell base station 40 when a transmitter of the access point 50 is switched from on to off. In step 2101, the mobile device 60 synchronizes with the macrocell base station 40 after performing the idle handoff. In step 2102, the mobile device 60 provides synchronization information to the access point 50 after the transmitter of the access point 50 is switched back on.

In various aspects in accordance with the methods of FIGS. 20 and 21, when the mobile device 60 (refer to FIG. 1) is within the coverage area of the access point 50, the access point 50 switches off its transmitter to trigger the mobile device 60 to idle handoff to the macrocell base station 40. Such methods could be performed in a periodic manner or an opportunistic manner. As an example of an opportunistic use of the methods, the access point 50 could trigger the mobile device 60 to perform the handoff when the mobile device 60 is in an idle state. In some aspects, the access point 50 first attempts to bar the cell to force the mobile device 60 to perform an idle handoff to the macrocell base station 40 and, if that does not work due to strong interference, then the access point 50 switches off its transmitter to force the idle handoff. In various aspects, after allowing sufficient time for the mobile device 60 to get synchronized with the macrocell base station 40, the access point 50 requests timing delta information from the mobile device 60.

Figure 22:
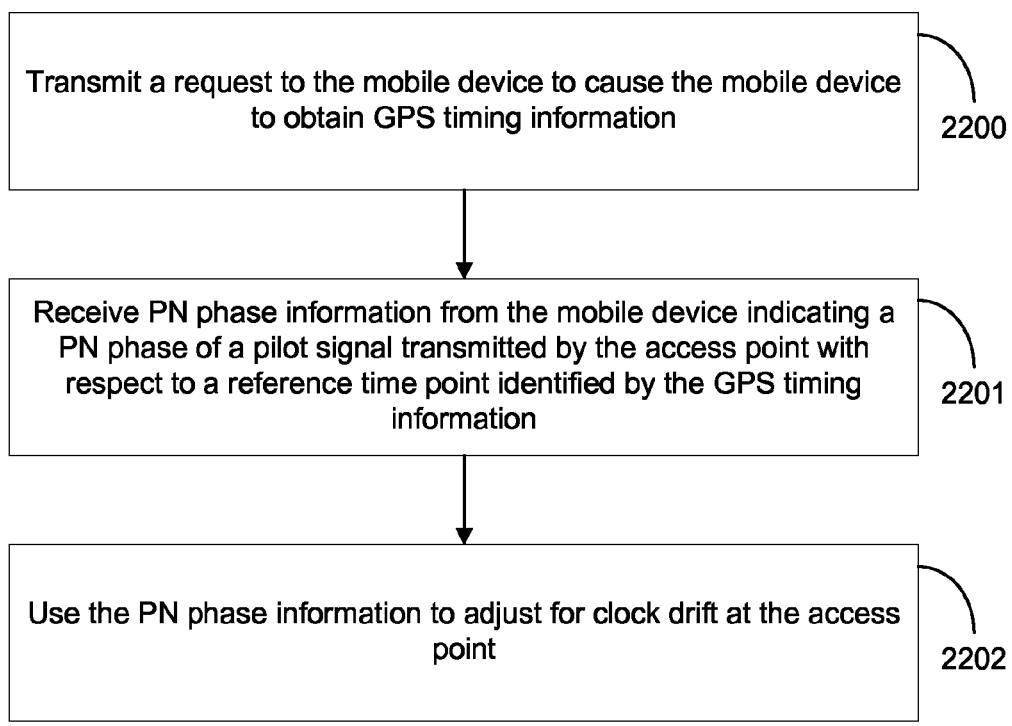
FIG. 22 illustrates a method for an access point to obtain information from a mobile device to adjust for clock drift at the access point.
Figure 23:
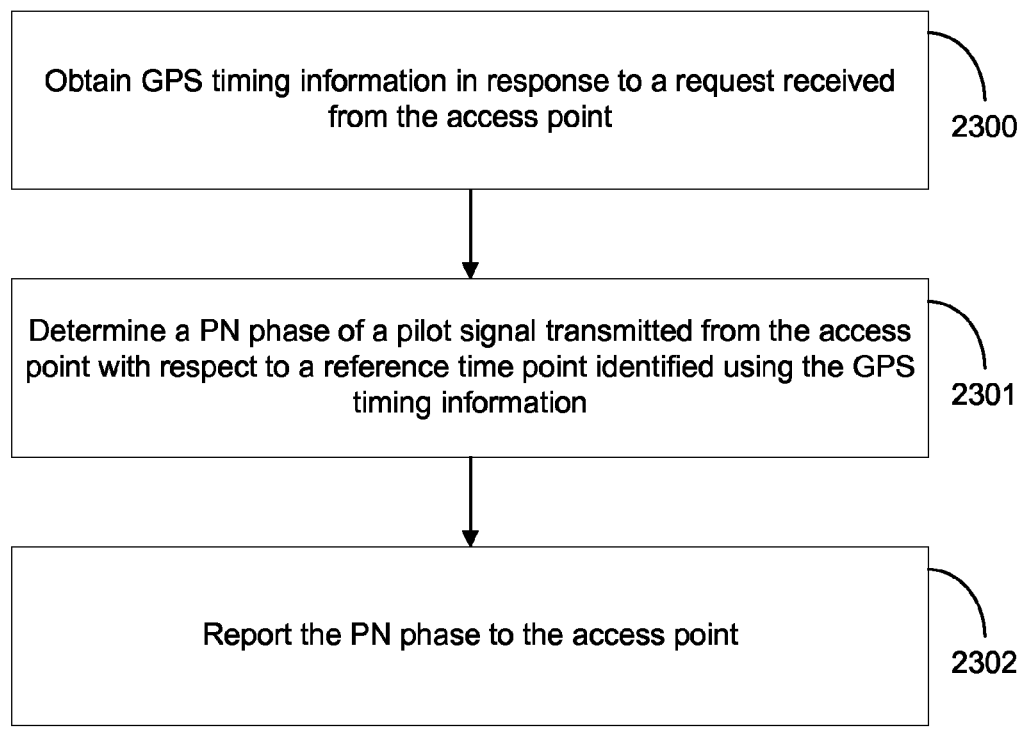
FIG. 23 illustrates a method for a mobile device to obtain GPS information and provide synchronization information to an access point based on the GPS information.

FIGS. 22 and 23 illustrate a third option for clock drift adjustment. FIG. 22 illustrates a method for an access point, and FIG. 23 illustrates a corresponding method for a mobile device. With reference to FIGS. 1 and 22, the method of FIG. 22 is performed by an access point, such as the access point 50. In step 2200, the access point 50 transmits a request to the mobile device 60 to cause the mobile device 60 to obtain GPS timing information. In step 2201, the access point 50 receives PN phase information from the mobile device 60 indicating a PN phase of a pilot signal transmitted by the access point 50 with respect to a reference time point identified by the GPS timing information. In step 2202, the access point 50 uses the PN phase information to adjust for clock drift at the access point 50.

With reference to FIGS. 1 and 23, the method of FIG. 23 is performed by a mobile device, such as the mobile device 60. In step 2300, the mobile device 60 obtains GPS timing information in response to a request received from the access point

50. In step 2301, the mobile device 60 determines a PN phase of a pilot signal transmitted from the access point 50 with respect to a reference time point identified using the GPS timing information. In step 2302, the mobile device 60 reports the PN phase to the access point 50. In various aspects, when the mobile device 60 is within the coverage area of the access point 50, the access point 50 requests the mobile device 60 to get the timing information from the GPS and to report the observed PN phase ($\theta_{MD}$).

Figure 24:
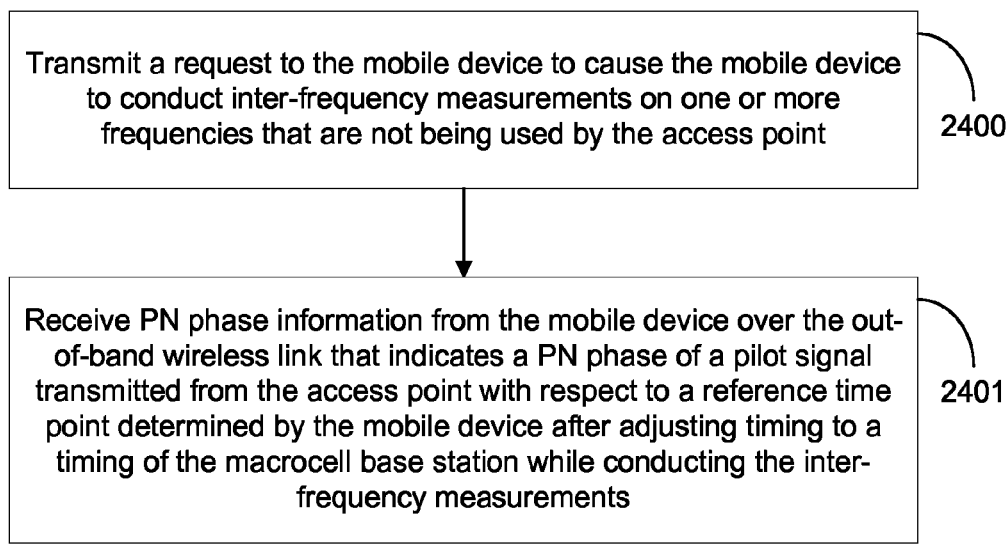
FIG. 24 illustrates a method for an access point to cause a mobile device to perform inter-frequency measurements and to receive information from the mobile device.
Figure 25:
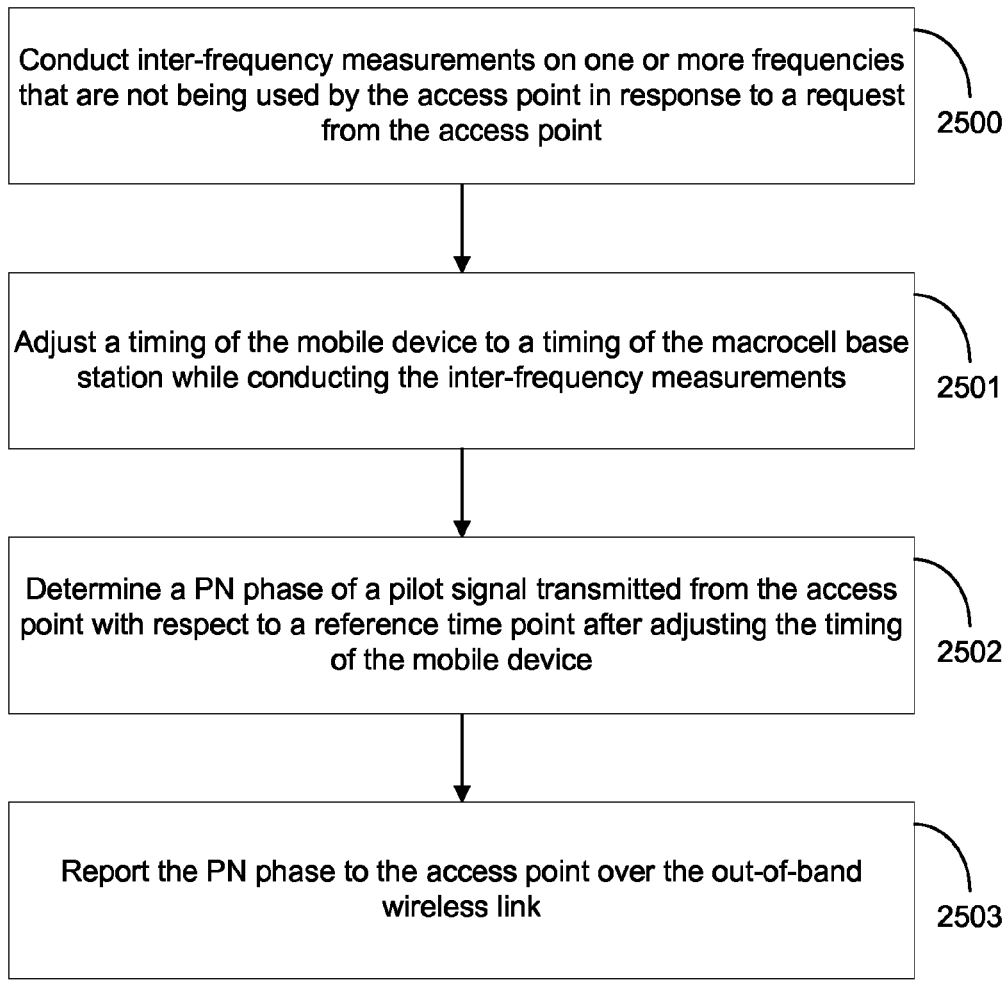
FIG. 25 illustrates a method for a mobile device to conduct inter-frequency measurements and provide information to an access point.

FIGS. 24 and 25 illustrate a fourth option for clock drift adjustment. FIG. 24 illustrates a method for an access point, and FIG. 25 illustrates a corresponding method for a mobile device. With reference to FIGS. 1 and 24, the method of FIG. 24 is performed by an access point, such as the access point 50. In step 2400, the access point 50 transmits a request to the mobile device 60 to cause the mobile device 60 to conduct inter-frequency measurements on one or more frequencies that are not being used by the access point 50. In step 2401, the access point 50 receives PN phase information from the mobile device 60 over the out-of-band wireless link that indicates a PN phase of a pilot signal transmitted from the access point 50 with respect to a reference time point determined by the mobile device 60 after adjusting timing to a timing of the macrocell base station 40 while conducting the inter-frequency measurements.

With reference to FIGS. 1 and 25, the method of FIG. 25 is performed by a mobile device, such as the mobile device 60. In step 2500, the mobile device 60 conducts inter-frequency measurements on one or more frequencies that are not being used by the access point 50 in response to a request from the access point 50. In step 2501, the mobile device 60 adjusts a timing of the mobile device 60 to a timing of the macrocell base station 40 while conducting the inter-frequency measurements. In step 2502, the mobile device 60 determines a PN phase of a pilot signal transmitted from the access point 50 with respect to a reference time point after adjusting the timing of the mobile device 60. In step 2503, the mobile device 60 reports the PN phase to the access point 50 over the out-of-band wireless link.

In various aspects in accordance with the methods of FIGS. 24 and 25, when the mobile device 60 (refer to FIG. 1) is within the coverage area of the access point 50, the access point 50 can request the mobile device 60 to make inter-frequency measurements. In various aspects, while conducting the inter-frequency measurements (on a frequency not being used by the access point 50) the mobile device 60 adjusts its own timing according to a timing of the macrocell base station 40. Also, in various aspects, the mobile device 60 then comes back to the frequency of the access point 50 and reports an observed PN phase ($\theta_{MD}$)) to the access point 50 via an out-of-band link or any form of IP connection.

As discussed above, after the initial fine synchronization, the access point 50 and the mobile device 60 can continue to cooperate to provide synchronization for the access point 50 to adjust for clock drift. Multiple methods may be implemented and used by the access point 50 to adjust for the clock drift.

In the first optional method, each time the mobile device 60 conducts an idle handoff from the macrocell base station 40 to the access point 50 it reports the PN phase information (or the timing difference between the macrocell base station 40 and the access point 50) to the access point 50 to allow the access point 50 to perform synchronization. The access point 50 estimates the clock drift from the PN phase information (or from the timing delta information) and adjusts its timing to offset the drift.

In the second optional method, after checking for the existence of the mobile device 60, the access point 50 switches off its transmitter to trigger the mobile device 60 to perform an idle handoff to the macrocell base station 40. This could be done in a periodic manner or in an opportunistic manner such as when the mobile device 60 is in an idle state. Once the mobile device 60 is synchronized with the macrocell base station 40, the access point 50 performs the above first optional method or the initial fine synchronization to adjust for the clock drift.

In the third optional method, the access point 50 requests that the mobile device 60 acquire GPS timing. This would work if the mobile device 60 can obtain a GPS signal. Once the mobile device 60 has the GPS timing, it can determine the PN phase information and provide the PN phase information to the access point 50 for the access point 50 to adjust its timing.

In the forth optional method, when the mobile device 60 is within the coverage area of the access point 50, the access point 50 can request the mobile device 60 to make inter-frequency measurements of frequencies not used by the access point 50. Since the frequency is not used by the access point 50, the macro signal does not suffer from a strong interference from the access point 50. Once the mobile device 60 obtains synchronization to the macrocell base station 40, the mobile device 60 reports the PN phase information (or the timing difference between the macrocell base station 40 and the access point 50) to the access point 50 to allow the access point 50 to perform synchronization.

In cases where the mobile device 60 obtains information for determining network time from the macrocell base station 40, the time obtained by the mobile device 60 may be slightly off due to propagation delay of the signal from the macrocell base station 40 to the mobile device 60. The error due to the propagation delay can be compensated, for example, by: (1) estimating the propagation delay using location information of the macrocell base station 40 and location information of the mobile device 60 and the speed of light; or (2) estimating the propagation delay by obtaining a round trip delay (RTD) measurement from the macrocell base station 40 and then dividing the RTD in half to calculate the one way propagation delay.

In various aspects, the mobile device 60 uses CDMA system time, and the mobile device 60 corrects for a lag in its CDMA system time that is caused due to over-the-air (OTA) propagation delay of a first usable multipath component from the macrocell base station 40. When the mobile device 60 uses a signal from the macrocell base station 40 to obtain timing information, it can correct the timing information to account for a propagation delay of the signal from the macrocell base station 40 to the mobile device 60. In various aspects, the mobile device 60 compensates for the propagation delay by estimating the propagation delay using location information of the macrocell base station 40. For example, the mobile device 60 obtains information about the location of the macrocell base station 40 and obtains information about its own location and then estimates a time needed for a signal to travel from the macrocell base station 40 to the mobile device 60. In some aspects, the mobile device 60 determines the propagation delay by obtaining RTD measurement information from the macrocell base station 40, or determining the RTD itself, and then dividing the RTD in half to obtain the one way propagation delay from the macrocell base station 40 to the mobile device 60. Once the mobile device 60 has determined the one way propagation delay, the mobile device 60 can adjust the received timing information by the propagation delay to compensate for the propagation delay.

Figure 26:
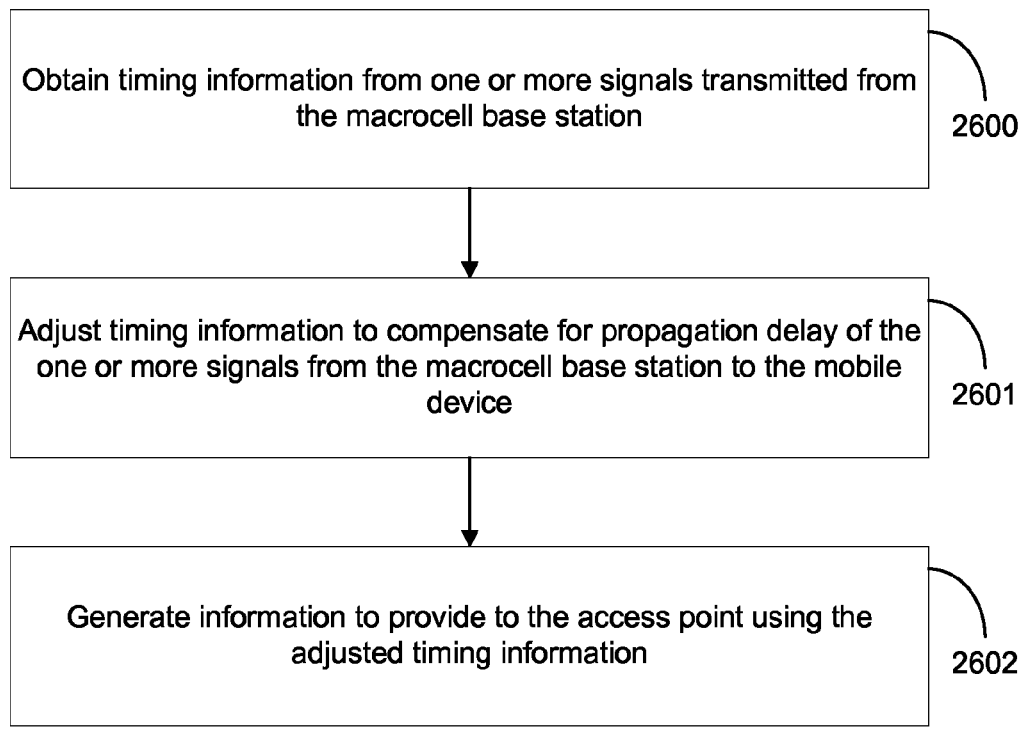
FIG. 26 illustrates a method for a mobile device to adjust for signal propagation delay and generate information using adjusted timing information.

FIG. 26 illustrates a method in accordance with an aspect for adjusting timing information to compensate for signal propagation delay. With reference to FIGS. 1 and 26, the method of FIG. 26 is performed by a mobile device, such as the mobile device 60. In step 2600, the mobile device 60 obtains timing information from one or more signals transmitted from the macrocell base station 40. In step 2601, the mobile device 60 adjusts the timing information to compensate for a propagation delay of the one or more signals from the macrocell base station 40 to the mobile device 60. In step 2602, the mobile device 60 generates information to provide to the access point 50 using the adjusted timing information. The access point 50 can then use the information received from the mobile device 60 to perform synchronization.

Figure 27:
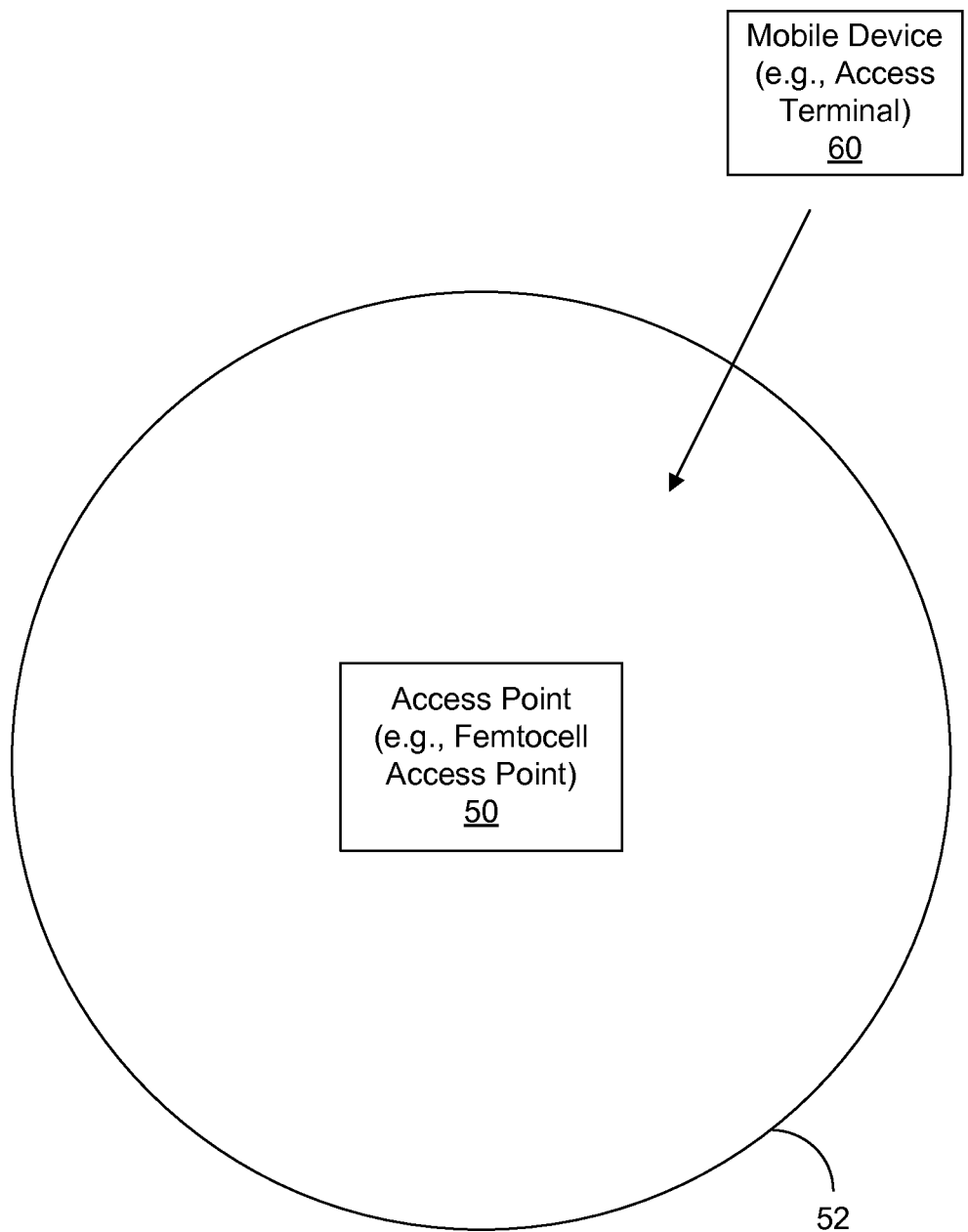
FIG. 27 illustrates an example of a mobile device outside of a coverage area of an access point and moving to enter the coverage area.

FIG. 27 illustrates a situation in which the mobile device 60 is outside of the coverage area 52 of the access point 50. In such a situation, when the mobile device 60 comes back into the coverage area 52 of the access point 50, as is illustrated by the arrow in FIG. 27, the access point 50 may perform proximity detection via an out-of-band link to detect the mobile device 60. In various aspects, the mobile device 60 may then cooperate with the access point 50 to allow the access point 50 to perform both coarse and fine synchronization steps. In some aspects, if no mobile device is within the coverage area 52 of the access point 50 and if the access point 50 does not have an alternative available for synchronization, then the access point 50 reduces its transmission power or even shuts down its transmitter after a long period of clock drift adjustment failure.

In various aspects, the mobile device assisted synchronization is used in conjunction with one or more other synchronization methods to augment those methods. Various other synchronization methods that can be used in conjunction with mobile device assisted synchronization or which can be replaced by mobile device assisted synchronization include (1) using a backhaul for synchronization; (2) using GPS timing for synchronization; (3) using broadcast sources for synchronization; and/or (4) using a network listen module for synchronization.

The backhaul synchronization option involves synchronizing an access point with a macrocell base station by transmitting packets with time information over a network to the access point. For example, the access point may be connected to a wide area network, such as the Internet, which is connected to the mobile operator core network, and packets with the time information for synchronization may be sent over the wide area network to the access point. One protocol for synchronizing clocks over the backhaul is the Network Time Protocol (NTP), which allows for synchronizing the clocks of computer systems over packet-switched, variable-latency data networks. Other protocols for synchronizing clocks over the backhaul are specified by IEEE 1588, such as the Precision Time Protocol (PTP), which is a protocol used to synchronize clocks throughout a computer network. The backhaul synchronization methods may have limited accuracy due to a variable latency of data networks used to distribute the timing information. Mobile device assisted synchronization can be used as a supplement to backhaul synchronization, or in place of backhaul synchronization, for improved synchronization accuracy.

Figure 28:
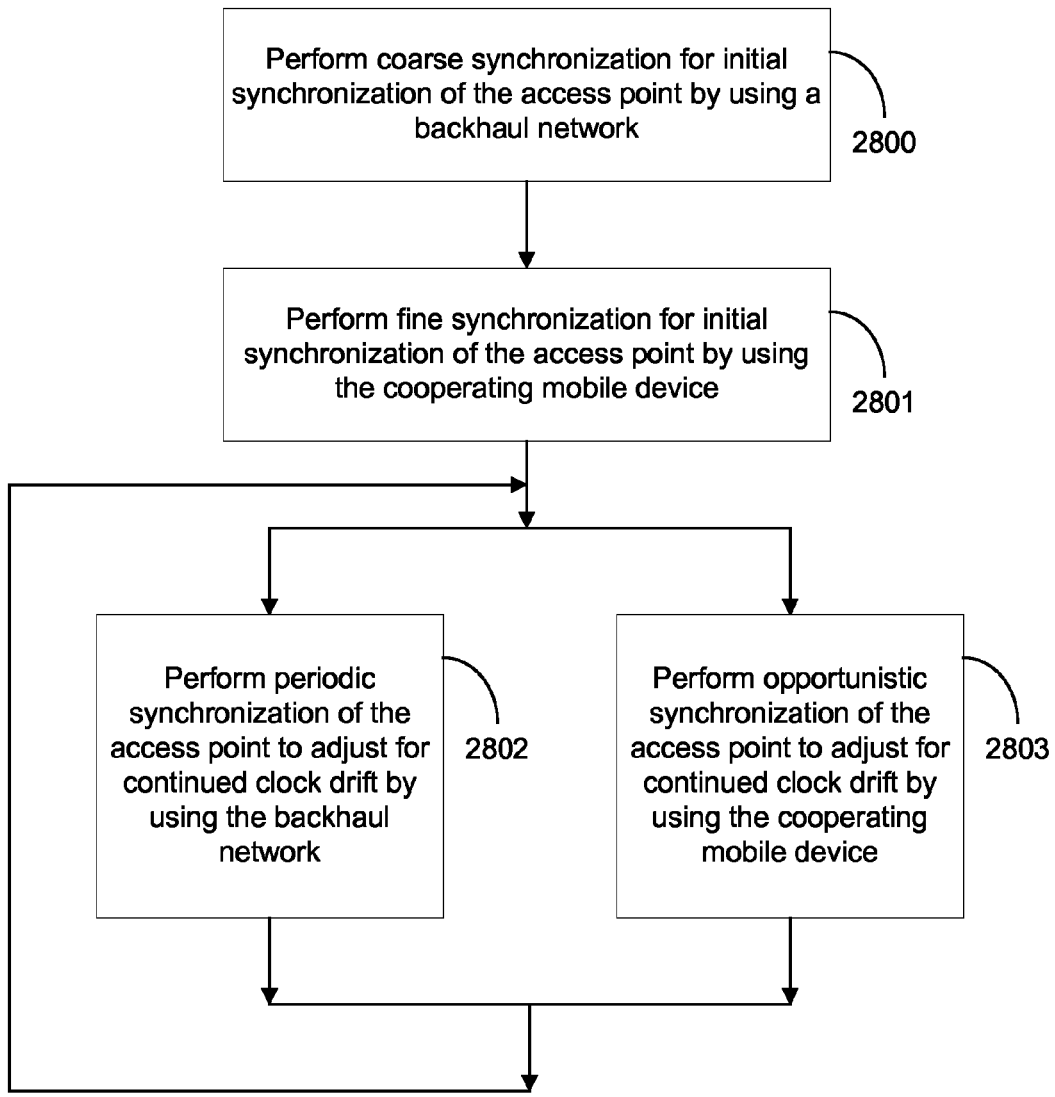
FIG. 28 illustrates a method for performing synchronization at an access point using a backhaul network and a cooperating mobile device.

FIG. 28 illustrates a method in accordance with an aspect for using both backhaul synchronization and mobile device assisted synchronization to synchronize an access point with a macrocell base station. With reference to FIGS. 1 and 28, in step 2800 the access point 50 performs coarse synchronization for initial synchronization of the access point 50 by using a backhaul network. In step 2801, the access point 50 performs fine synchronization for initial synchronization of the access point 50 by using the cooperating mobile device 60. The access point 50 can then perform steps 2802 and 2803 in parallel for continued synchronization to adjust for clock drift. In step 2802 the access point 50 performs periodic coarse synchronization to adjust for continued clock drift by using the backhaul network. In step 2803 the access point 50 performs opportunistic fine synchronization of the access point 50 to adjust for continued clock drift by using the cooperative mobile device 60.

With such a method, the access point 50 could maintain coarse synchronization by using the backhaul even if there is a long absence of the mobile device 60 from the coverage area 52 of the access point 50. In some aspects, the access point 50 may rely mainly on the backhaul for synchronization and use the mobile device 60 opportunistically when needed, so as to allow the mobile device 60 to conserve battery power. Also, in some aspects, a limit is specifiable for an amount of battery consumption of the mobile device 60 that can be devoted to actions for access point synchronization, and the mobile device 60 could be used for synchronization until reaching the battery consumption limit at which time the access point 50 would need to wait for the mobile device 60 to be recharged before using the mobile device 60 again for cooperative synchronization purposes.

A GPS timing synchronization option involves synchronizing an access point with a macrocell base station by using a GPS receiver at the access point to receive time information from a global positioning system satellite. In many instances, the time used by the macrocell base station is the same as the time used for GPS or is offset from the time used for GPS by a known and fixed amount, so the GPS time can be used to synchronize with the macrocell base station. Using GPS timing information for synchronization has disadvantages in that there are coverage limitations for indoor areas and it may require an external antenna, which adds to network cost.

A broadcast sources synchronization option involves synchronizing an access point with a macrocell base station by receiving timing information in broadcast signals, such as television station signals or the like. In many instances, the time used by the macrocell base station is the same as the time used by television stations or is offset from the time used by television stations by a known and fixed amount, so the television station time can be used to synchronize with the macrocell base station. Using television station broadcast timing information for synchronization requires television signal coverage at the location of the access point and there is also extra cost involved to have the required hardware to receive and decode the television signal.

A network listen module synchronization option involves using a dedicated network listen module, which is also called a network listen unit, that is connected to an access point to receive timing information from signals transmitted by a macrocell base station and to use the timing information to synchronize the access point with the macrocell base station. The use of a network listen module for synchronization requires an additional modem, which increases system cost, and there are also potential coverage issues regarding the reception of signals from the macrocell base station, and such a system may necessitate periodic silence periods for an access point. The need for silence periods occurs when a signal to be received by the network listen module is in the same band as transmissions from the access point. In such a situation, the access point transmissions would need to be shut down when the signal with timing information is being received by the network listen module, so as to avoid radio frequency coupling between transmissions and the received signal. The periodic shutting down of the access point transmissions to allow for the network listen module signal reception would lead to service outages during those shut down times.

In some aspects, mobile device assisted synchronization is used to augment network listen module synchronization. This would allow for additional options for synchronization in case there are coverage issues due to a location of the network listen module with the network listen module not being able to receive signals. In such an instance, a mobile device could be used to perform the network listen functions for the access point. In various aspects, mobile device assisted synchronization is used to completely replace network listen module synchronization, so that there would be no need to have a dedicated network listen module, which would reduce system cost. In such instances, the mobile device would cooperate with the access point to provide Network Listen functions. Also, unlike network listen module operation, which requires shutting off access point transmissions during network listen module measurements, the use of a mobile device to perform Network Listen functions does not require interruption of access point transmissions, so service outages could be avoided with mobile device assisted synchronization.

Mobile device assisted synchronization can augment any of the other synchronization options. For example, an access point may have a synchronization solution that uses all of the above mentioned options, i.e., backhaul, GPS, television signal, network listen module, and mobile device assisted synchronization. In some aspects, the mobile device assisted synchronization provides another additional synchronization method to fall back on in case one or more other methods are not functioning properly.

Figure 29:
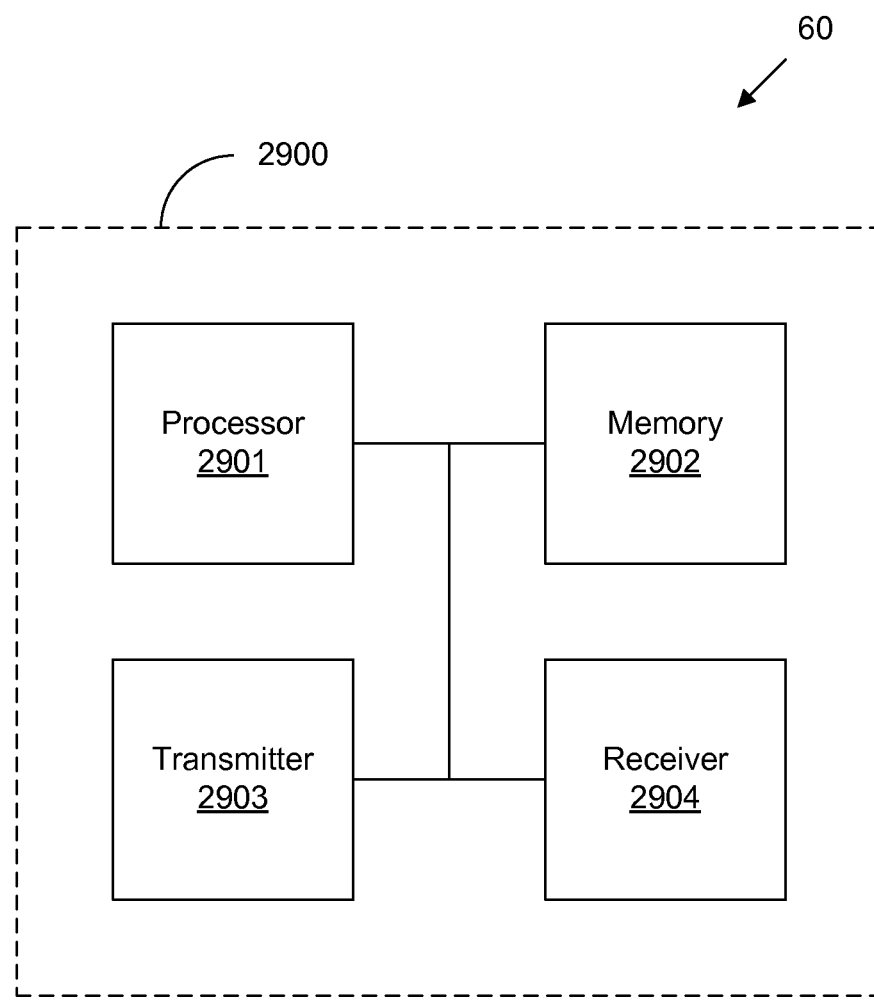
FIG. 29 illustrates a block diagram of a mobile device in accordance with an aspect.

FIG. 29 illustrates a block diagram of an example of the mobile device 60 in accordance with an aspect. The example mobile device 60 includes circuitry 2900. The circuitry 2900 includes a processor 2901, memory 2902, a transmitter 2903, and a receiver 2904. The processor 2901 executes program code stored in the memory 2902 to perform steps of methods disclosed herein. The transmitter 2903 is controllable by the processor 2901 to transmit wireless signals. The receiver 2904 is controllable by the processor 2901 to receive wireless signals. In some aspects, the transmitter 2903 is controllable to transmit in-band signals and out-of-band signals. For example, in some aspects the transmitter 2903 performs transmission for cellular communication and also provides transmissions for Wi-Fi™ or Bluetooth™ communication. In some aspects, the receiver 2904 is controllable to receive in-band signals and out-of-band signals. For example, in some aspects the receiver 2904 receives cellular signals and also receives signals for Wi-Fi™ or Bluetooth™ communication. In some aspects, a single transceiver (not shown) performs the functions of the transmitter 2903 and the receiver 2904. In some aspects, there are separate transmitters for the in-band and out-of-band transmissions. Also, in some aspects, there are separate receivers for the in-band and out-of-band communication.

The techniques described herein may be used for various wireless communication systems such as Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), and/or other systems. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. Further, such wireless communication systems may additionally include peer-to-peer ad hoc networks, 802.xx wireless LAN, BLUETOOTH, and/or any other short- or long-range, wireless communication techniques. In various aspects, the transmitter 2903 and the receiver 2904 are configured to perform the desired types of communication.

Figure 30:
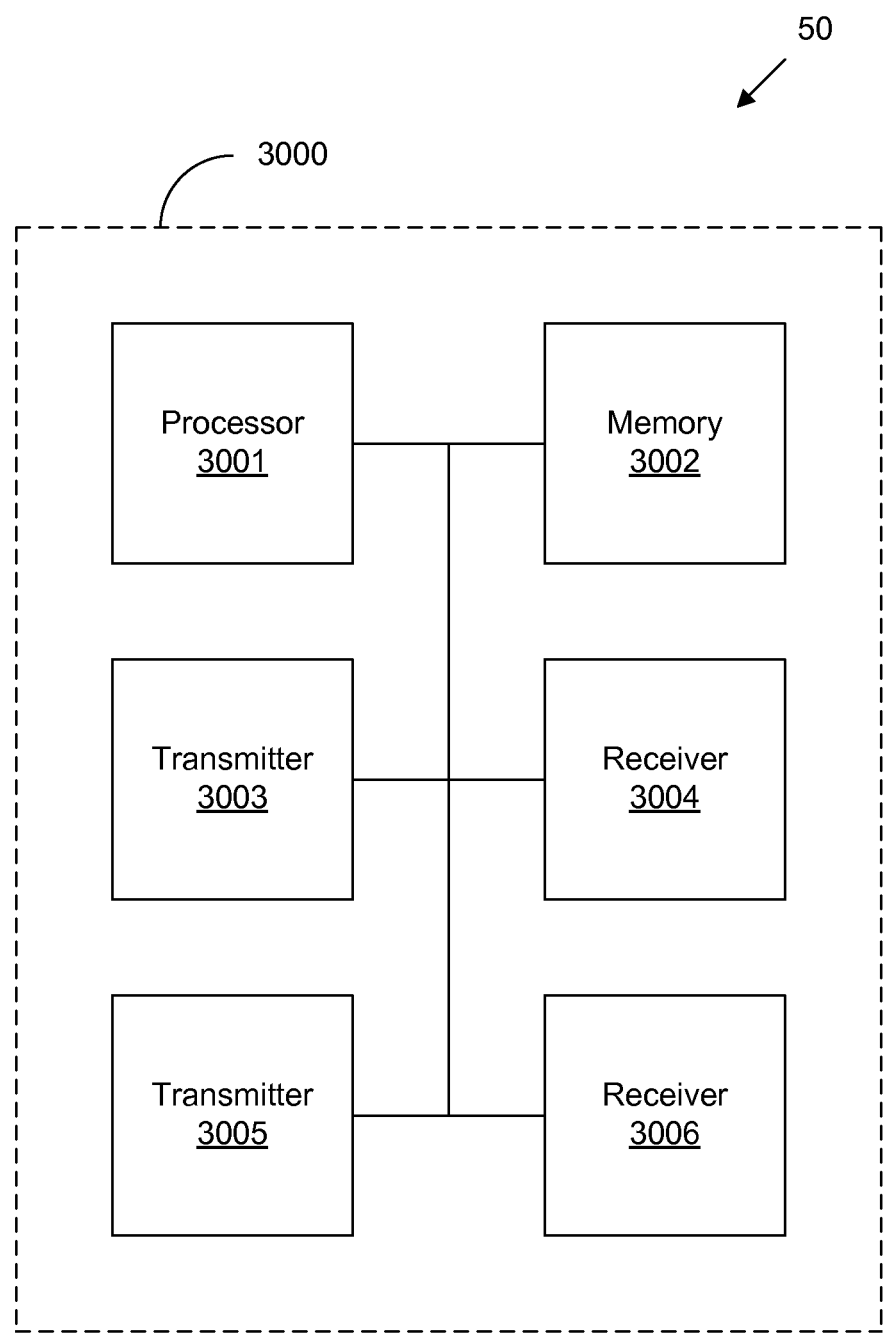
FIG. 30 illustrates a block diagram of an access point in accordance with an aspect.

FIG. 30 illustrates a block diagram of an example of the access point 50 in accordance with an aspect. The example access point 50 includes circuitry 3000. The circuitry 3000 includes a processor 3001, memory 3002, a transmitter 3003, a receiver 3004, a transmitter 3005, and a receiver 3006. The processor 3001 executes program code stored in the memory 3002 to perform steps of methods disclosed herein.

The transmitter 3003 is controllable by the processor 3001 to transmit wireless signals. The receiver 3004 is controllable by the processor 3001 to receive wireless signals. In some aspects, the transmitter 3003 is controllable to transmit in-band signals and out-of-band signals. For example, in some aspects the transmitter 3003 performs transmission for cellular communication and also provides transmissions for Wi-Fi™ or Bluetooth™ communication. In some aspects, the receiver 3004 is controllable to receive in-band signals and out-of-band signals. For example, in some aspects the receiver 3004 receives cellular signals and also receives signals for Wi-Fi™ or Bluetooth™ communication. In some aspects, a single transceiver (not shown) performs the functions of the transmitter 3003 and the receiver 3004. In some aspects, there are separate transmitters for the in-band and out-of-band transmissions. Also, in some aspects, there are separate receivers for the in-band and out-of-band communication. In various aspects, the transmitter 3003 and the receiver 3004 are configured to perform the desired types of communication.

The transmitter 3005 performs transmission of data to a wide area network. The receiver 3006 performs the reception of data from a wide area network. In some aspects, the transmitter 3005 and the receiver 3006 are implemented as a modem to transmit and receive data. In various aspects, the transmitter 3005 and the receiver 3006 are controllable by the processor 3001.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In some aspects, the processor and the storage medium may reside as discrete components in a mobile device. In some aspects, the processor and the storage medium may reside as discrete components in an access point.

In one or more exemplary designs, the functions described may be implemented in hardware, software, firmware, or any combination thereof If implemented in software, the functions may be stored as one or more instructions or program code on a non-transitory computer-readable storage medium or non-transitory processor-readable storage medium. A storage medium may be any available media that can be accessed by a general purpose or special purpose computer or processor. By way of example, and not limitation, such computer-readable or processor-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media and/or processor-readable media.

While the foregoing disclosure discusses illustrative aspects, it should be noted that various changes and modifications could be made herein without departing from the scope of the described aspects as defined by the appended claims. Accordingly, the described aspects are intended to embrace all such alterations, modifications, and variations that fall within a scope of the appended claims. Additionally, all or a portion of any aspect may be utilized with all or a portion of any other aspects, unless stated otherwise.

What is claimed is:

1. A method performed by a mobile device, the method comprising:
providing first information from the mobile device to an access point over an out-of-band wireless link, the first information usable by the access point to coarsely synchronize with a macrocell base station;
providing second information from the mobile device to the access point over the out-of-band wireless link, the second information usable by the access point to finely synchronize with the macrocell base station; and
communicating with a mobile operator core network through the access point using an in-band wireless link from the mobile device to the access point.

2. The method of claim 1, further comprising:
making measurements of signals from both the access point and the macrocell base station to determine the second information.

3. The method of claim 1,
wherein the in-band wireless link uses one or more frequencies that are within a set of frequency ranges designated for cellular phone network use for communications with base stations connected to the mobile operator core network; and
wherein the out-of-band wireless link uses one or more frequencies that are outside of the set of frequency ranges designated for cellular phone network use.

4. The method of claim 1, further comprising:
receiving, from the access point, a pilot signal that is formed using a pseudo-random noise (PN) sequence; and
determining a measured PN phase of the pilot signal from a reference time point.

5. The method of claim 4,
wherein the second information provided to the access point over the out-of-band wireless link includes information about the measured PN phase.

6. The method of claim 4,
wherein the second information provided to the access point over the out-of-band wireless link includes information about a difference between the measured PN phase and an estimate of an actual PN phase for the access point.

7. The method of claim 1, further comprising:
receiving, from the access point, a pilot signal that is formed using a pseudo-random noise sequence that repeats periodically;
wherein the first information provided to the access point over the out-of-band wireless link is usable by the access point to perform coarse synchronization to synchronize with the macrocell base station to within $\pm\frac{1}{2}$ of a period of the pseudo-random noise sequence.

8. The method of claim 1,
wherein the second information provided to the access point over the out-of-band wireless link is usable by the access point to perform fine synchronization to synchronize with the macrocell base station to within a time deviation that is less than a synchronization requirement specified by a standard used for the in-band wireless link.

9. The method of claim 1, wherein said providing first information comprises:

transferring time information to the access point over the out-of-band wireless link.

10. The method of claim 1, further comprising:
performing measurements on received signals to generate measurement report messages;
wherein said providing first information comprises providing the measurement report messages to the access point over the out-of-band wireless link.

11. The method of claim 1, further comprising:
providing pseudo-random noise (PN) phase information to the access point over the out-of-band wireless link when the mobile device conducts an idle handoff from the macrocell base station to the access point, the PN phase information indicating a PN phase of a pilot signal transmitted from the access point with respect to a reference time point.

12. The method of claim 1, further comprising:
providing timing information to the access point over the out-of-band wireless link when the mobile device conducts an idle handoff from the macrocell base station to the access point, the timing information indicating a timing difference between the macrocell base station and the access point.

13. The method of claim 1, further comprising:
performing an idle handoff from the access point to the macrocell base station when a transmitter of the access point is switched from on to off;
synchronizing with the macrocell base station after performing the idle handoff; and
providing synchronization information to the access point after the transmitter of the access point is switched back on, the synchronization information usable by the access point to adjust for a timing difference between the macrocell base station and the access point.

14. The method of claim 1, further comprising:
obtaining global positioning system (GPS) timing information in response to a request received from the access point;
determining a pseudo-random noise (PN) phase of a pilot signal transmitted from the access point with respect to a reference time point identified using the GPS timing information; and
reporting the PN phase to the access point.

15. The method of claim 1, further comprising:
conducting inter-frequency measurements on one or more frequencies that are not being used by the access point in response to a request from the access point;
adjusting a timing of the mobile device to a timing of the macrocell base station while conducting the inter-frequency measurements;
determining a pseudo-random noise (PN) phase of a pilot signal transmitted from the access point with respect to a reference time point after adjusting the timing of the mobile device; and
reporting the PN phase to the access point over the out-of-band wireless link.

16. The method of claim 1, further comprising:
obtaining timing information from one or more signals transmitted from the macrocell base station;
adjusting the timing information to compensate for propagation delay of the one or more signals from the macrocell base station to the mobile device; and
generating the information that is provided to the access point using the adjusted timing information.

17. The method of claim 1, further comprising:
performing neighborhood discovery for the access point and transmitting neighborhood discovery information to the access point;
obtaining network measurements for the access point and transmitting the network measurements to the access point; and
decoding overhead channels for specific sets of primary scrambling codes and transmitting contents of overhead messages corresponding to the primary scrambling codes to the access point.

18. A mobile device, comprising:
circuitry configured to provide first information to an access point over an out-of-band wireless link, the first information usable by the access point to coarsely synchronize with a macrocell base station;
said circuitry configured to provide second information to the access point over the out-of-band wireless link, the second information usable by the access point to finely synchronize with the macrocell base station; and
said circuitry configured to communicate with a mobile operator core network through the access point using an in-band wireless link to the access point.

19. A mobile device, comprising:
means for providing first information to an access point over an out-of-band wireless link, the first information usable by the access point to coarsely synchronize with a macrocell base station;
means for providing second information to the access point over the out-of-band wireless link, the second information usable by the access point to finely synchronize with the macrocell base station; and
means for communicating with a mobile operator core network through the access point using an in-band wireless link to the access point.

20. A non-transitory processor readable storage medium storing one or more programs that when executed by a processor of a mobile device cause the mobile device to perform a method, the method comprising:
providing first information from the mobile device to an access point over an out-of-band wireless link, the first information usable by the access point to coarsely synchronize with a macrocell base station;
providing second information from the mobile device to the access point over the out-of-band wireless link, the second information usable by the access point to finely synchronize with the macrocell base station; and
communicating with a mobile operator core network through the access point using an in-band wireless link from the mobile device to the access point.

21. The non-transitory processor readable storage medium of claim 20,
wherein the in-band wireless link uses one or more frequencies that are within a set of frequency ranges designated for cellular phone network use for communications with base stations connected to the mobile operator core network; and
wherein the out-of-band wireless link uses one or more frequencies that are outside of the set of frequency ranges designated for cellular phone network use.

22. The non-transitory processor readable storage medium of claim 20, the method further comprising:
receiving, from the access point, a pilot signal that is formed using a pseudo-random noise (PN) sequence; and
determining a measured PN phase of the pilot signal from a reference time point.

23. The non-transitory processor readable storage medium of claim 20, the method further comprising:
   receiving, from the access point, a pilot signal that is formed using a pseudo-random noise sequence that repeats periodically;
   wherein the first information provided to the access point over the out-of-band wireless link is usable by the access point to perform coarse synchronization to synchronize with the macrocell base station to within ±½ of a period of the pseudo-random noise sequence.

24. The non-transitory processor readable storage medium of claim 20, the method further comprising:
   providing pseudo-random noise (PN) phase information to the access point over the out-of-band wireless link when the mobile device conducts an idle handoff from the macrocell base station to the access point, the PN phase information indicating a PN phase of a pilot signal transmitted from the access point with respect to a reference time point.

25. The non-transitory processor readable storage medium of claim 20, the method further comprising:
   providing timing information to the access point over the out-of-band wireless link when the mobile device conducts an idle handoff from the macrocell base station to the access point, the timing information indicating a timing difference between the macrocell base station and the access point.

26. The non-transitory processor readable storage medium of claim 20, the method further comprising:
   performing an idle handoff from the access point to the macrocell base station when a transmitter of the access point is switched from on to off;
   synchronizing with the macrocell base station after performing the idle handoff; and
   providing synchronization information to the access point after the transmitter of the access point is switched back on, the synchronization information usable by the access point to adjust for a timing difference between the macrocell base station and the access point.

27. The non-transitory processor readable storage medium of claim 20, the method further comprising:
   obtaining global positioning system (GPS) timing information in response to a request received from the access point;
   determining a pseudo-random noise (PN) phase of a pilot signal transmitted from the access point with respect to a reference time point identified using the GPS timing information; and
   reporting the PN phase to the access point.

28. The non-transitory processor readable storage medium of claim 20, the method further comprising:
   conducting inter-frequency measurements on one or more frequencies that are not being used by the access point in response to a request from the access point;
   adjusting a timing of the mobile device to a timing of the macrocell base station while conducting the inter-frequency measurements;
   determining a pseudo-random noise (PN) phase of a pilot signal transmitted from the access point with respect to a reference time point after adjusting the timing of the mobile device; and
   reporting the PN phase to the access point over the out-of-band wireless link.

29. The non-transitory processor readable storage medium of claim 20, the method further comprising:
   obtaining timing information from one or more signals transmitted from the macrocell base station;
   adjusting the timing information to compensate for propagation delay of the one or more signals from the macrocell base station to the mobile device; and
   generating the information that is provided to the access point using the adjusted timing information.

30. The non-transitory processor readable storage medium of claim 20, the method further comprising:
   performing neighborhood discovery for the access point and transmitting neighborhood discovery information to the access point;
   obtaining network measurements for the access point and transmitting the network measurements to the access point; and
   decoding overhead channels for specific sets of primary scrambling codes and transmitting contents of overhead messages corresponding to the primary scrambling codes to the access point.

31. The mobile device of claim 18,
   wherein the in-band wireless link uses one or more frequencies that are within a set of frequency ranges designated for cellular phone network use for communications with base stations connected to the mobile operator core network; and
   wherein the out-of-band wireless link uses one or more frequencies that are outside of the set of frequency ranges designated for cellular phone network use.

32. The mobile device of claim 19,
   wherein the in-band wireless link uses one or more frequencies that are within a set of frequency ranges designated for cellular phone network use for communications with base stations connected to the mobile operator core network; and
   wherein the out-of-band wireless link uses one or more frequencies that are outside of the set of frequency ranges designated for cellular phone network use.

* * * * *